US007249056B1

(12) United States Patent
Crouthamel et al.

(10) Patent No.: US 7,249,056 B1
(45) Date of Patent: Jul. 24, 2007

(54) METHOD AND SYSTEM FOR EXCHANGING DATA BETWEEN AFFILIATED SITES

(75) Inventors: James Crouthamel, Chicago, IL (US);
Stuart Watson, Chicago, IL (US);
Daeron Meyer, Franklin, WI (US)

(73) Assignee: Performics, Inc., Chicago, IL (US)

( * ) Notice: Subject to any disclaimer, the term of this patent is extended or adjusted under 35 U.S.C. 154(b) by 322 days.

(21) Appl. No.: 09/640,437

(22) Filed: Aug. 17, 2000

(51) Int. Cl.
*G06Q 30/00* (2006.01)
(52) U.S. Cl. .......................................... 705/26; 705/37
(58) Field of Classification Search ................. 705/26, 705/27, 37; 345/604
See application file for complete search history.

(56) References Cited

U.S. PATENT DOCUMENTS

| | | | |
|---|---|---|---|
| 5,319,542 A | 6/1994 | King, Jr. et al. ............. 364/401 |
| 5,537,314 A | 7/1996 | Kanter ....................... 364/406 |
| 5,590,197 A | 12/1996 | Chen et al. .................... 380/24 |
| 5,634,053 A * | 5/1997 | Noble et al. ................. 395/604 |
| 5,673,322 A * | 9/1997 | Pepe et al. .................... 705/52 |
| 5,692,206 A | 11/1997 | Shirley et al. ............. 395/793 |
| 5,708,780 A | 1/1998 | Levergood et al. .... 395/200.12 |
| 5,712,979 A | 1/1998 | Graber et al. .......... 395/200.11 |
| 5,715,314 A | 2/1998 | Payne et al. .................. 380/24 |
| 5,715,315 A | 2/1998 | Handelman .................. 380/49 |

(Continued)

OTHER PUBLICATIONS

"Thomson Financial Services Acquires EDI World, Inc.; Thomson Financial Publishing to Expand Electronic Commerce Initiatives", Business Editors. Business Wire. New York: Apr. 6, 1998. p. 1, downloaded from ProQuest on the Internet on Apr. 2007, 2 pages.*

D. Connolly & L. Masinter, Network Working Group Request for Comments 2854, "The 'text/html' Media Type", Jun. 2000, pp. 1-9.

E. Rescorla & A. Schiffman, Network Working Group Request for Comments: 2660, "The Secure HyperText Transfer Protocol," Aug. 1999, pp. 1-45.

(Continued)

*Primary Examiner*—James Zurita
(74) *Attorney, Agent, or Firm*—Gary R. Jarosik

(57) ABSTRACT

A system and method is provided for exchanging data between at least one merchant site and at least one partner site across an interconnected computer network. The at least one merchant site enables a user to conduct a transaction on the merchant site, and employs a merchant database format. The at least one partner site has a link to the at least one merchant site and/or a display of transactional information from the at least one merchant site, and employs a partner database format different than the merchant database format. The display of transactional information of the at least one partner site enables a user to conduct a transaction with the at least one merchant site on the at least one partner site. A clearinghouse site is also provided in communication with the at least one merchant site and the at least one partner site. The clearinghouse site has at least one translator to convert data compliant with the merchant database format into data compliant with the partner database format, and is also capable of sending such converted data to the at least one partner site. In addition, the clearinghouse site may have at least one further translator to convert data complaint with the partner database format into data compliant with the merchant database format, and may also be capable of sending such converted data to the at least one merchant site.

17 Claims, 12 Drawing Sheets

U.S. PATENT DOCUMENTS

| | | | | |
|---|---|---|---|---|
| 5,717,860 | A | | 2/1998 | Graber et al. .......... 395/200.12 |
| 5,724,424 | A | | 3/1998 | Gifford ........................ 380/24 |
| 5,745,681 | A | | 4/1998 | Levine et al. ............ 395/200.3 |
| 5,812,769 | A | | 9/1998 | Graber et al. .......... 395/200.12 |
| 5,819,285 | A | | 10/1998 | Damico et al. ............. 707/104 |
| 5,848,396 | A | | 12/1998 | Gerace ........................ 705/10 |
| 5,913,210 | A | * | 6/1999 | Call ............................ 705/20 |
| 5,991,740 | A | | 11/1999 | Messer ........................ 705/27 |
| 6,029,141 | A | | 2/2000 | Bezos et al. .................. 705/27 |
| 6,128,655 | A | * | 10/2000 | Fields et al. ............. 707/501.1 |
| 6,199,077 | B1 | * | 3/2001 | Inala et al. ..................... 704/1 |
| 6,338,050 | B1 | * | 1/2002 | Conklin et al. ............... 705/80 |
| 6,338,059 | B1 | * | 1/2002 | Fields et al. .................. 707/10 |

OTHER PUBLICATIONS

Abbay Bhushan, et al., Network Working Group Request for Comments #265, "The File Transfer Protocol," Nov. 17, 1971, pp. 1-12.

R. Fielding, et al., Network Working Group Request for Comments: 2616, "Hypertext Transfer Protocol—HTTP/1.1," Jun. 1999, pp. 1-176.

T. Dierks, et al., Network Working Group Request for Comments: 2246, "The TLS Protocol," Jan. 1999, pp. 1-80.

T. Berners-Lee, et al., Network Working Group Request for Comments: 1945, "Hypertext Transfer Protocol—HTTP/1.0," May 1996, pp. 1-60.

T. Berners-Lee, et al., Network Working Group Request for Comments: 1866, "Hypertext Markup Language—2.0," Nov. 1995, pp. 1-77.

W. Houser, et al., Network Working Group Request for Comments: 1865, "EDI Meets the Internet," Jan. 1996, pp. 1-41.

"Recommendation F.435: Message Handling: Electronic Data Interchange Messaging Service," International Telecommunication Union, CCITT (The International Telegraph and Telephone Consultative Committee), Geneva, 1991, pp. 1-47.

* cited by examiner

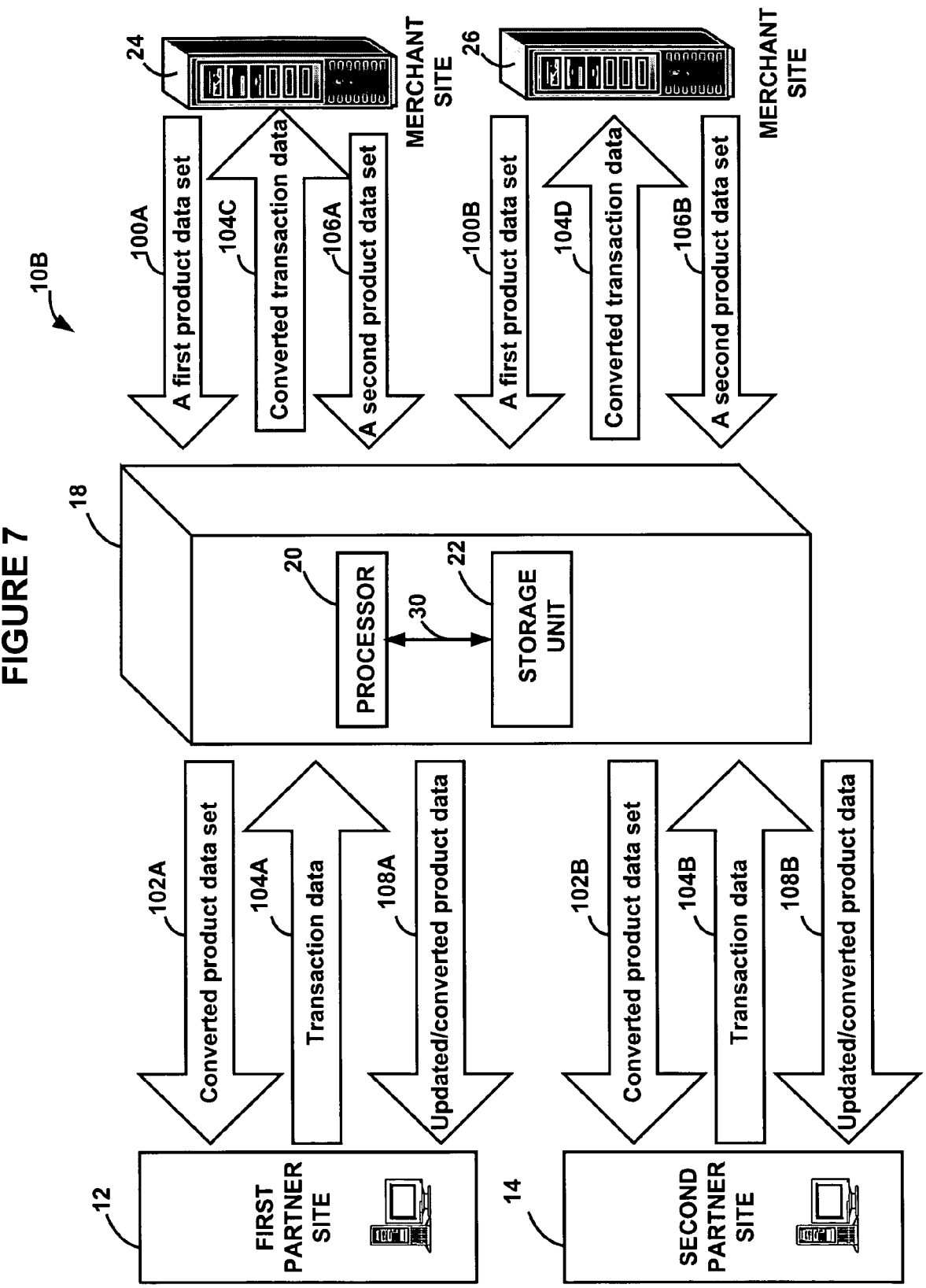

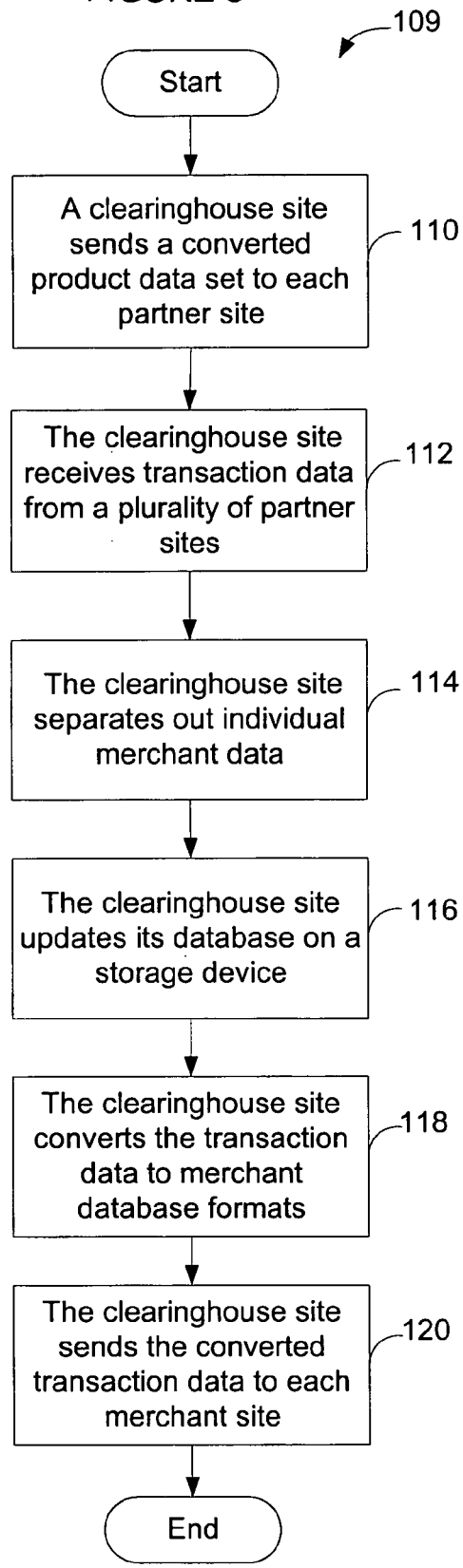

METHOD AND SYSTEM FOR EXCHANGING DATA BETWEEN AFFILIATED SITES

FIELD OF THE INVENTION

The present invention relates in general to a data processing system for managing product data from a plurality of sites across interconnected computer networks. More particularly, the present invention relates to a method and a system for exchanging sets of product and transaction data between a plurality of partner sites employing partner database formats and a plurality of merchant sites employing merchant database formats.

BACKGROUND OF THE INVENTION

In recent years, businesses have been making increased efforts to sell products and services through computers linked by interconnected computer networks. Many of these businesses have utilized the largest network today, the Internet, for such sales efforts. As known in the art, the Internet is a combination of large computer networks joined together over a high-speed backbone and data links. The Internet provides access to information stored on individual sites managed by various providers. As the Internet grows in its complexity, a greater part of population becomes more familiar with the skills required to access and communicate using the Internet.

Therefore, it is not surprising that many businesses use the Internet, especially a subset of the Internet known as the World Wide Web (the "Web"), as a significant sales channel and commerce forum. Web servers typically employ the HyperText Transfer Protocol ("HTTP") to enable users to communicate over a number of hyperlinks that interconnect numerous web sites to each other. The web sites are usually created using the HyperText Markup Language ("HTML"), which is a set of "markup" symbols or codes inserted in a file intended for displaying on a web browser. The markup symbols typically direct the Web browser how to display a web page's words and images for the user. For more information on HTTP and HTML, see Internet Engineering Task Force ("IETF") Request For Comments ("RFC") 1945 and RFC 2616, and RFCs 1866 and 2854, respectively, all of which are specifically incorporated in their entirety herein by reference.

Its graphical environment makes the web ideal for supporting a wide variety of a "online marketing". A few years ago, "online marketing" meant ensuring a good placement with web search engines. As the search engines and placements proliferated, businesses using this type of the marketing technique became increasingly undifferentiated. To solve this problem and, further, to expand many businesses' reach across the web, the businesses have adopted a marketing technique commonly referred to as "affiliate marketing" for advertising their products and/or services without incurring fixed costs.

E-commerce companies, such as Amazon.com and CDNow.com, pioneered the affiliate marketing. These companies created a system in which web publishers ("affiliates") could build mini storefronts on their web sites and, thus, effectively push many merchant's brands to a broader base of potential customers. These storefronts have been typically developed in a form of promotions, such as banner ads, combining graphics and text into an appealing display of merchants' products. By placing the banner adds for products that are targeted to the kinds of people who traffic the affiliate web site, the merchants and the affiliates are able to conduct e-commerce "in context." Thus, the merchants may place banner ads for travel books on travel web sites, and parenting books on sites for new parents, for instance. Typically, merchants pay no initial fee for placing banner ads on affiliate sites but, instead, the merchant pays a "per-action" commission to the affiliate sites. The "actions" may be a click-through, a membership sign-up, an actual product purchase, or a fulfillment relationship.

Affiliate marketing is popular among many merchants because it is predictable, measurable and profitable. By pushing different customer promotions to different affiliates, the merchant may recognize how well each affiliate is performing. Further, such arrangement enables merchants to continually adjust their marketing, merchandising and a mixture of affiliates to optimize the merchants' overall performance.

Despite its attractiveness, the conventional affiliate marketing is perhaps the least efficient and effective way to develop high-performance based marketing that results in positive returns on investments. First of all, the conventional affiliate marketing is built on an implicit assumption that all affiliates are good partners for all merchants. Typically, the vast majority of a merchant's affiliate sales come from a relatively small number of affiliate sites associated with the merchant site. As more affiliate sites learn to effectively influence the affiliate marketing channel, this small number of revenue partners may grow. However, it will never reach the scale of the hundreds of thousands of good partner sites that traditional affiliate marketing providers seek to draw to their networks, and, in the long run, these networks are obstacles to an effective affiliate channel performance. To recruit real revenue partners, merchants must either analyze a vast pool of affiliates, or they must commit to paying the ongoing costs of servicing and supporting tens of thousands of affiliate sites, of which, only a few thousand may actually create value for the merchants.

Furthermore, as affiliate sites grow in complexity to display an increasing number of merchants' products and/or services, many affiliate sites resort to building proprietary databases both to keep track of such products and/or services and also to enable visitors to search these databases in order to locate advertised products. As a merchant changes its product line, pricing or availability, the affiliates' databases must be updated to reflect these changes so consumers continue to see current information on affiliate sites. Therefore, the affiliate sites need to receive and store the most current product (or service) data from a variety of merchants, each of which may make independent decision about how to store and transmit data internally.

Currently, if a merchant site wishes to send product data to its affiliate sites, the merchant has to convert the product data into formats that its affiliate sites are able to process. If the merchant site has hundreds of affiliate sites, this process becomes so time consuming that many merchant sites choose to leave it up to the affiliate sites to convert the product data format into their proprietary database formats. However, many of the affiliate sites do not have resources available to do this, which, in turn, leaves them with unreadable product data that can not be processed.

Additionally, as many of the affiliate sites generate sales on a merchant's behalf, transaction data must be reported back to the merchant site to fulfill the sales and to ensure that the affiliate site receives an appropriate commission for the sales from the merchant. Because a single affiliate site may represent multiple merchants, the affiliate site may be forced to go through lengthy conversion processes to report the transaction data back to each merchant so the transaction data is in each merchant's preferred database format.

The complexity of this problem grows as a number of interconnected merchants and affiliates increases. In an exemplary system including two affiliate sites representing two merchant sites, a total of eight data conversions must take place if each affiliate site and each merchant site employs a different database format. In such a system, each affiliate site must convert, for instance, transaction data to the database formats of the two merchant sites, and each merchant site must convert, for instance, product data to the database formats of the two affiliate sites. Thus, for a system with ten affiliates representing ten merchants, two hundred conversions would be necessary if each merchant site and each affiliate site employ unique database formats.

Furthermore, as networked commerce grows increasingly sophisticated, merchants and affiliates recognize a need to share new kinds of information in addition to basic product data. For instance, this information includes tracking purchases of individual users on the Internet, as well as informing customers of up-to-date product availability.

Therefore, a need exists for a method and system that solves all of the above inefficiencies of the existing methods and systems.

SUMMARY OF THE INVENTION

The present invention provides a method for exchanging data between at least one merchant site and at least one partner site across an interconnected computer network. The at least one merchant site employs a merchant database format, and the at least one partner site employs a partner database format. The method of the present invention comprises the steps of providing a clearinghouse site in communication with the at least one merchant site and the at least one partner site, and providing at least one translator on the clearinghouse site for converting data compliant with the merchant database format into data compliant with the partner database format. The method of the present invention also comprises the step of receiving on the clearinghouse site a first set of data from the at least one merchant site, with the first set of data being compliant with the merchant database format. In addition, the method of the present invention comprises the steps of converting on the clearinghouse site with the at least one translator the first set of data into a second set of data compliant with the partner database format, and sending from the clearinghouse site the second set of data to the at least one partner site.

The method of the present invention may further include the step of providing at least one further translator on the clearinghouse site for converting data compliant with the partner database format into data compliant with the merchant database format. The method of the present invention may also comprise the step of receiving on the clearinghouse site a third set of data from the at least one partner site, with the third set of data being compliant with the partner database format. In addition, the method of the present invention may comprise the steps of converting on the clearinghouse site with the at least one further translator the third set of data into a fourth set of data compliant with the merchant database format, and sending from the clearinghouse site the fourth set of data to the at least one merchant site.

The present invention further provides a system for managing sets of data across an interconnected computer network. The system of the present invention comprises at least one merchant site that employs a merchant database format and enables a user to conduct a transaction on the merchant site. The system of the present invention also comprises at least one partner site that employs a partner database format different from the merchant database format, and has at least one of a link to the at least one merchant site and a display of transactional information from the at least one merchant site. The display of transactional information enables a user to conduct a transaction with the at least one merchant site on the at least one partner site. Moreover, the system of the present invention comprises a clearinghouse site in communication with the at least one merchant site and the at least one partner site. The clearinghouse site has at least one translator to convert a first set of data compliant with the merchant database format into a second set of data compliant with the partner database format. The clearinghouse site is also capable of sending the second set of data to the at least one partner site.

The clearinghouse site may further have at least one further translator to convert a third set of data compliant with the partner database format into a fourth set of data compliant with the merchant database format. The clearinghouse site may also be capable of sending the fourth set of data to the at least one merchant site.

BRIEF DESCRIPTION OF THE DRAWINGS

FIG. 7 is a block diagram illustrating an exemplary flow of data in an exemplary system of the present invention employing a "closed loop" method for completing a transaction.

FIG. 8 is a flow chart illustrating a method for converting by the clearinghouse site order data from partner sites to database formats of merchant sites, and for tracking transactions in the "closed loop" system, according to the exemplary embodiment of the present invention.

DETAILED DESCRIPTION OF EXEMPLARY EMBODIMENTS

Figure 1:
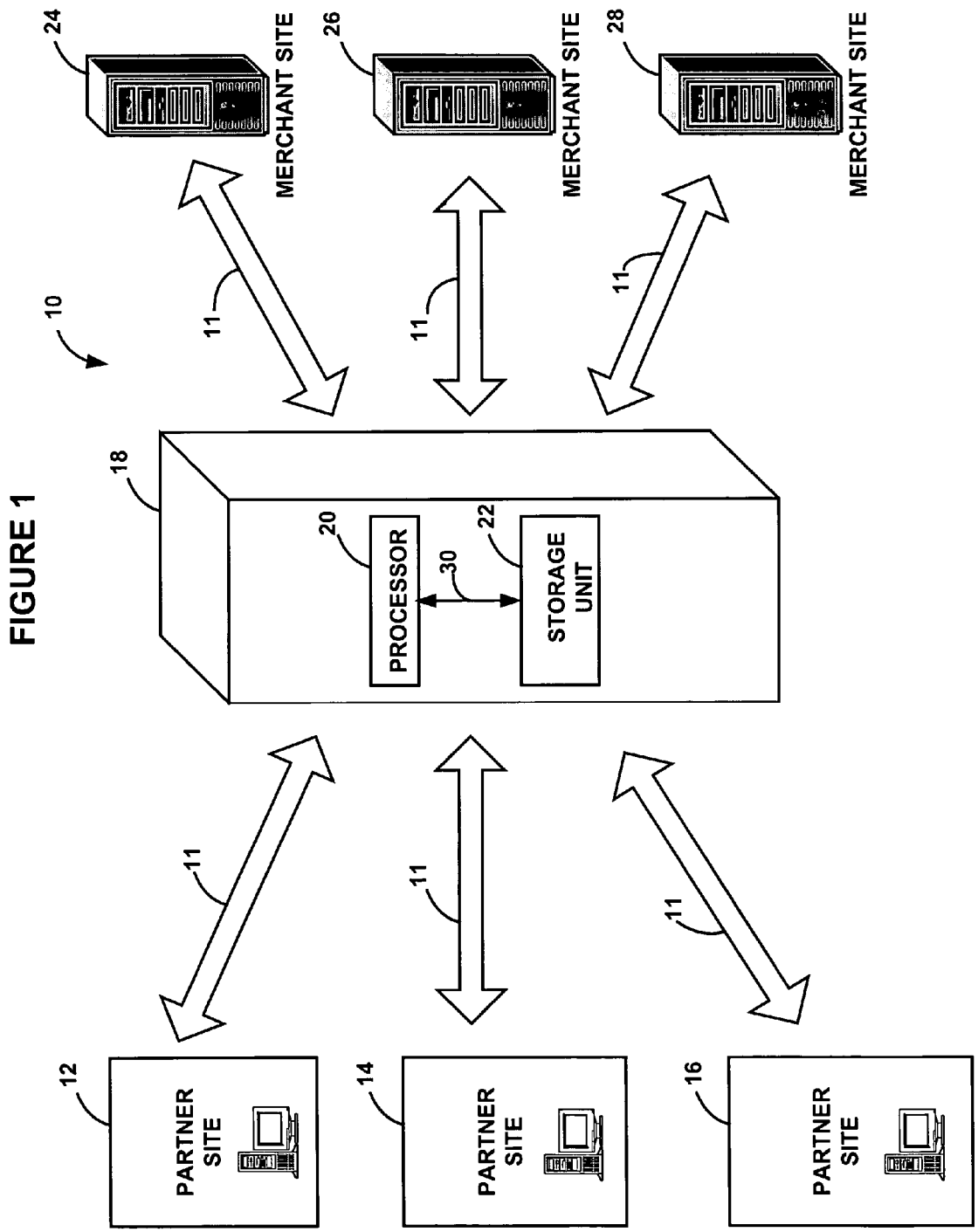
FIG. 1 is a block diagram illustrating a system in which the present invention may be employed.

Referring to the drawings, FIG. 1 is a block diagram illustrating a system 10 arranged to employ exemplary embodiments of the present invention. As shown in FIG. 1, the system includes three partner sites 12, 14 and 16 (also referred to as "affiliate sites"), three merchant sites 24, 26 and 28, and a clearinghouse site 18, all of which are interconnected across one or more computer networks 11, such as Wide Area Networks ("WANs"), the World Wide Web ("WWW"), and/or the Internet. However, the computer networks could also take other forms, such as any communication network. Additionally, for simplicity, only three partner sites, three merchant sites and one clearinghouse site are illustrated in FIG. 1. However, people skilled in the art will appreciate that more or fewer partner sites and merchant sites could also be used, and, further, that more than one clearinghouse site could also be used. Additionally, other arrangements and other elements, whether or not separately known in the prior art, are contemplated and could also be used.

For ease of illustration, the system 10, and its partner and merchant sites 12, 14, 16, 24, 26, 28, are described herein with reference to "products," as opposed to "services' or "memberships." It should be understood, however, that the system and method of the present invention may be used equally well with "services" and/or "memberships" in lieu of, or in addition to, "products."

As shown in FIG. 1, the system 10 comprises three partner sites, each of which is managed and configured to provide information on its web site for users browsing the web. Further, each partner site displays a number of promotions, such as banners, text, Java applets, and/or hyperlinks, that contain code for providing a link to advertising products available for viewing and purchase on at least one of the merchant sites. In other words, the promotions typically include code that creates a link to one or more web pages of the merchant sites. According to the exemplary embodiment, the link from each partner site is created to direct a user (i.e., customer) first to the clearinghouse site 18, and then to one of the merchant sites. In addition, or alternatively, each partner site may employ software enabling a user to make a purchase directly on the partner site of an advertised product offered by one or more merchant sites without actually directly linking the user/customer to the merchant sites.

According to the exemplary embodiment, a partner server (not shown) may manage each partner site. The partner server may be equipped with hardware modules, including sufficient internal and external memory and software implementations to manage each partner site. Further, each partner server may be programmed to employ a unique partner database format for managing each partner site. For ease of illustration, hereinafter, it is assumed that some of the aspects of the present invention described in reference to the partner sites are actually performed by the servers (or other hardware/software) associated with the partner sites.

According to the exemplary embodiment, each partner site in FIG. 1 employs a unique partner database format. However, the exemplary embodiment does not require, and should not be limited to, every partner site employing a unique partner database format, and two or more partner sites may employ a similar, or even the same, partner database format. Additionally, each partner site is preferably also equipped with appropriate communication modules responsible for communicating with each merchant site via the clearinghouse site 18.

As shown in FIG. 1, the system 10 also comprises three merchant sites 24, 26, and 28 with appropriate hardware and software for storing and displaying web pages and maintaining information databases associated with the products offered by each merchant site. According to the exemplary embodiment, each merchant site preferably has communication modules for communicating with at least one of the partner sites 12, 14 and 16 via the clearinghouse site 18. A merchant server or a plurality of merchant servers (not shown) may manage each of the merchant sites 24, 26, 28 in a similar fashion as the partner servers manage the partner sites. For ease of illustration, hereinafter, it is assumed that some of the aspects of the present invention described in reference to the merchant sites are actually performed by the servers (or other hardware/software) associated with the merchant sites.

Additionally, similar to the partner sites, the merchant sites 24, 26 and 28 may be configured to employ various merchant database formats for exchanging information, such as product information, with partner sites. According to the exemplary embodiment, each merchant site employs a unique merchant database format other than partner database formats. However, the present invention is not limited to each merchant site employing the unique merchant database format, and two or more merchant sites may employ a similar, or even the same, merchant database format, as well as some merchant database formats could be identical to some of the partner database formats.

The clearinghouse site 18 comprises communication modules linking the clearinghouse site 18 with the network 11, and with any merchant site and partner site interested in using the services based on the aspects of the present invention described herein. In the exemplary embodiment, the clearinghouse site 18 is arranged to communicate with the partner sites 12, 14, 16 and the merchant sites 24, 26, 28. Further, the clearinghouse site 18 comprises a server (not shown) with a processor 20 linked to a storage device 22 via an interface 30. For ease of illustration, hereinafter, it is assumed that some of the aspects of the present invention described in reference to the clearinghouse site are actually performed by the server (or other hardware/software) associated with the clearinghouse site.

The storage device 22 includes a sufficient internal and external memory volume to meet demands of a number of merchant and partner sites connected to the clearinghouse site 18. Preferably, the storage unit 22 comprises a set of translators for converting data between the merchant database formats and the partner database formats. According to the exemplary embodiment, the data could be product information data or transaction data. However, the present invention is not limited to these types of data, and other types of data could also be employed in the present invention. Further, the storage device 22 comprises a set of internal tables for storing data associated with the partner sites 12, 14, 16 and merchant sites 24, 26, 28, such as merchant and partner identification data, product information data or transaction data. The clearinghouse site 18 is also preferably equipped with database management software configured to operate with a specific operating system.

The clearinghouse site 18 is preferably configured to store predetermined data at a remote user site, such as a user site browsing a web page of the partner site, by means of a "cookie" utility that forms an integral part of any conventional web browser. The predetermined data may include information on a user's site history (i.e., which sites the user has visited), order history, transaction data, etc. After the predetermined data has been registered, the "cookie" assures that only a specified server will be able to access that data when establishing communication with that particular user. Thus, any other remote server that will establish communication with this particular user will be prohibited from accessing the private data. The use of "cookies" is well-known in the art and commonly used as a means for tracking a user's whereabouts and online orders in the affiliate marketing field. Accordingly, "cookie" technology will not be described in detail in the present application.

Further, as in most telecommunications applications, those skilled in the art will appreciate that many of the elements described herein are functional entities that may be implemented as discrete components or in conjunction with other components, in any suitable combination and location. Thus, for instance, the realization of the clearinghouse site 18 as a conventional server is only an example. The clearinghouse site 18 could be realized as a distributed system, and its different modules could be located in different platforms and/or locations. Still further, various functions, which are described herein as being performed by one or more entities, may be carried out by the processor 20 executing an appropriate set of machine language instructions stored on the storage device 22. Those skilled in the art, provided with the present disclosure, may readily prepare appropriate computer instructions to perform such functions.

Prior to any transaction taking place, each merchant site and each partner site preferably create accounts on the clearinghouse site 18. The merchant account may specify how much the merchant will pay a partner site for actions taken by customers, such as a percentage commission on sales, flat rates for site membership, or click-through to the merchant site. According to the exemplary embodiment, a partner site may apply to become a member of either a merchant's partner program or a general partner pool program of the clearinghouse site 18. If the partner site applies as the member of the general partner pool program, the clearinghouse site 18 may refer the partner site to the merchant sites that best represents the partner site's interests (and vice versa). Additionally, any merchant site applying to register with the clearinghouse site 18 may request to participate in a referral program offered by the clearinghouse site 18. If the merchant site requests a participation in the referral program, the clearinghouse site 18 may match that merchant with partners that best represent merchant site's interests.

Figure 2:
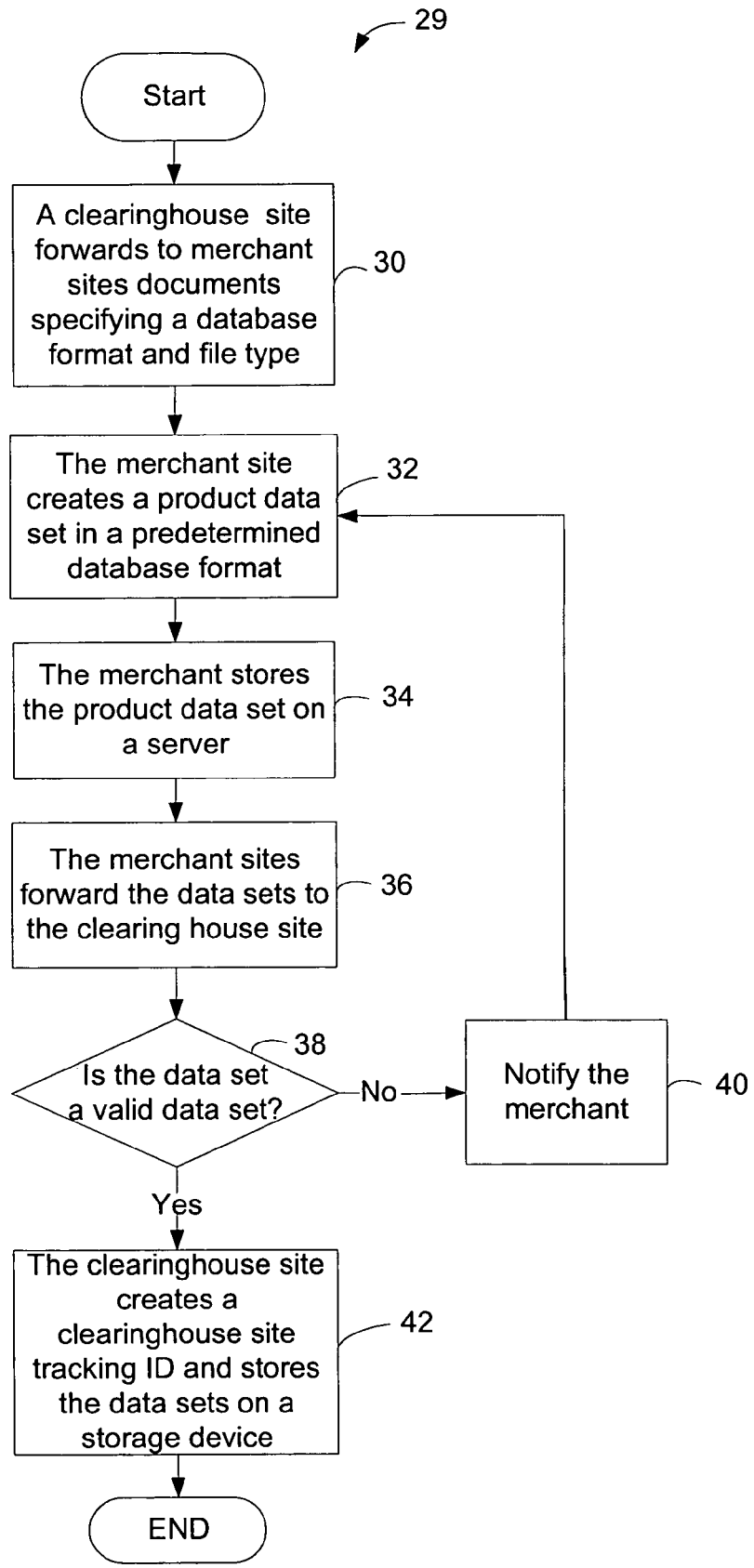
FIG. 2 is a flow chart illustrating a method for a first time pre-validation of a merchant site's data.

Turning to FIG. 2, a method 29 for a first time pre-validation process of a merchant site's data is presented in a flow chart. The pre-validation method presented in FIG. 2 will be described as applied to the merchant site 24 and the merchant site 26. Hereinafter, the merchant site 24 will be referred to as a first merchant site 24, and the merchant site 26 will be referred to as a second merchant site 26. However, it should be understood that every merchant site requesting the clearinghouse site's services could employ a similar, or the same, first time pre-validation process.

At step 30, the clearinghouse site 18 forwards a set of registration documents to the first merchant site 24 and the second merchant site 26. According to the exemplary embodiment, the set of registration documents may specify a file type and a database format in which the merchant sites 24 and 26 should generate any data to be sent to and used on the clearinghouse site 18, such as product information data or transaction data, for instance. Preferably, but not necessarily, the database format specified in the set of registration documents is a clearinghouse database format. However, the clearinghouse site 18 could be set up to accept other database formats and/or more than one file type. Thus, the first and second merchant sites 24 and 26 may be given greater flexibility as to what format to use for configuring their product information data, such as product stock keeping unit ("SKU") data. Alternatively, the clearinghouse site 18 may impose a standard database format and/or file type for all merchant sites to follow. Further, the set of registration documents that the clearinghouse site 18 forwards to the merchant sites may comprise delivery methods and formats that the first merchant site 24 and the second merchant site 26 may employ for sending data to the clearinghouse site 18 and for receiving any data from the clearinghouse site 18.

At step 32, the first merchant site 24 and the second merchant site 26 generate general information documents, and also extract product information data from their databases. Then, preferably, but not necessarily, the merchant sites may combine the extracted product information data into the database format specified by the clearinghouse site 18. Table 1 shows an exemplary general information document that the first merchant site 24 and the second merchant site 26 may provide to the clearinghouse site 18 (along with any extracted product information) during the pre-registration process.

TABLE 1

| Field Name | Version | Max Length | Options | Format | Example/Comments |
|---|---|---|---|---|---|
| Created_Date | 1.0 | 8 | N/A | YYYYMMDD | 19991125 |
| Merchant_ID | 1.0 | 10 | N/A | Ccvid0000000 | Ccvid0000012 |
| Version | 1.5 | 5 | N/A | | 1.2 |
| Number_Records | 1.0 | 10 | | | 500 |
| Email | 1.0 | N/A | N/A | Info@merch.com | Merchant's e-mail |
| Home_Page | 1.0 | N/A | N/A | http://www.m.com | |
| Store_Type | 1.0 | 20 | Online Local Action site | | Online store (choose only one option) |
| Credit_Type | 1.0 | N/A | VISA AMEX DISCOVER | | Separate with tabs on same line. Merchant can add any credit card name. |
| Ship_To | 1.0 | N/A | US CA | | Separate by tabs on same line. Two letter country code. |
| Allow_Add | 1.0 | 5 | 1 or YES 0 or NO | | YES Designate different shipping address than billing address. |

As shown in Table 1, the "Created_Date" is a date for when the data set was created from the merchant's product database. The "Merchant_ID" is a unique identifier that the clearinghouse site 18 may assign to the first merchant site 24 and the second merchant site 26 upon a completion of a request to participate in a referral program. The "Version" may relate to a version number of a product data format set being uploaded from the merchant site to the clearinghouse site 18. The "Number_Records" may be a total number of product information records found in the data set. The "Email" entry is an e-mail address of the merchant site that the clearinghouse site 18 may use to send product questions. The "Home_Page" entry is a web page address of the home page of each merchant site. The "Credit_Type" entry lists the types of credit cards that are accepted by the merchant site when a transaction takes place at one of the partner sites. The "Ship_To" field comprises information on the countries to which the merchant site allows shipments. The "Allow_Add" entry may comprise information regarding whether or not the merchant site allows the billing address to be different than the shipping address, so that the clearinghouse site 18 can make the partner sites aware of the merchant site's requirements. It should be understood, however, that the above fields in Table 1 are only exemplary fields, and additional fields, such as optional fields, could also be used. Thus, the present invention should not be limited to employing only the information data shown in Table 1.

As mentioned above, in step 32, the first merchant site 24 and second merchant site 26 also extract their product information data, such as product SKU data, from their databases. Subsequently, the merchant sites 24 and 26 may create product data sets of product information data in a format that corresponds to the database format specified by the clearinghouse site 18. An exemplary set of extracted product information data that the clearinghouse site 18 may request from merchant sites is shown in Table 2.

TABLE 2

| Field Name | Description |
| --- | --- |
| Product_ID | The ID used by a merchant site to identify a product |
| Product_URL | The URL where a shopper may view product information and an option to add the product to the shopping card |
| Buy_URL | The URL where a shopper can add the product to a shopping card or the URL to add the product directly into the shopping card |
| Category | List the category under which the product falls into |
| Brief_Description | For the partners that require short description of the product |
| Price | Price of the product in USD |
| Image_URL | The URL for the image located on the merchant's server |
| Product_Name | The product name, which is valuable if the product name is well recognized |

At step 34, the first merchant site 24 and the second merchant site 26 store the formatted product information data, such as the product SKU data, on their servers. According to the exemplary embodiment that will be described in greater detail below, the clearinghouse site 18 may be programmed to periodically query each merchant site's server for updated product information data.

At step 36, the first merchant site 24 and the second merchant site 26 forward the general information documents and the product information data to the clearinghouse site 18. The merchant sites may employ one of the delivery methods specified by the clearinghouse site 18 to forward the general information documents and the product information data. For instance, the merchant site may use e-mail for delivery. Alternatively, the merchant site may use a File Transfer Protocol ("FTP"), a HyperText Transfer Protocol ("HTTP"), a Secure HyperText Transfer Protocol ("S-HTTP") (also commonly known as HTTPS), a Transfer Layer Security ("TLS"), a Secure Sockets Layer ("SSL"), or any other desirable delivery method presently known or developed in the future. For more information on FTP, S-HTTP, and TLS, see IETF RFCs 265, 2660, and 2246, respectively, all of which are specifically incorporated in their entirety herein by reference. After attempting the selected delivery method, a status of receipt or non-receipt may be available to the communicating parties (i.e., the merchant and clearinghouse sites), so that the merchant sites may, if necessary, re-forward the general information documents and/or product information data to the clearinghouse site 18. Once a receipt status is acknowledged, the process moves to a validation process (step 38).

At step 38, when the clearinghouse site 18 receives the general information documents and the product information data from the first merchant site 24 and the second merchant site 26, the clearinghouse site 18 may initiate the validation process. To do that, the clearinghouse site's processor 20, executing a predetermined set of instructions retrieved from the storage device 22, may verify whether the received general information documents comprise all of the specified and required information. Then, the processor 20 may verify whether all of the required product information data fields are present and properly formatted. To do that, the processor 20 may divide the received data fields into a predefined number of blocks and, further, test whether each block comprises a correct type of data. Thus, for instance, the processor 20 may verify whether the "price" field comprises numerical characters rather than the alpha text of a product description.

If the general information document or the product information data from either of the merchant sites comprises invalid data or is improperly formatted, as shown at step 40, the clearinghouse site 18 then notifies the non-compliant merchant site and requests the merchant site to send corrected data. In such a case, the steps 30, 32, 34, 36 and 38 shown in FIG. 2 are repeated until the general information documents and product information data are valid and properly formatted.

When the clearinghouse site 18 validates the general information documents and the product information data, as shown at step 42, the clearinghouse site 18 then generates unique clearinghouse site tracking identifiers for the individual products of the merchant sites 24 and 26. Further, the clearinghouse site 18 may create a mapping system to correlate the individual clearinghouse site tracking identifier and that merchant site's product information data identifiers. Such mapping between two identifiers allows the clearinghouse site 18 to track individual products at partner sites. When the clearinghouse site tracking identifiers are assigned to the individual products of each merchant site, the clearinghouse site 18 may normalize the received data and compile it into one or more internal mapping tables in the storage device 22.

The following is an example of such an internal mapping table:

TABLE 3

| Merchant ID | Product ID | Clearinghouse Tracking ID |
| --- | --- | --- |
| 24 | HS1175 | 001 |
| 24 | HS1176 | 002 |
| 26 | XY2243 | 003 |

The "Merchant ID" column of Table 3 represents the identifier that has been assigned to a particular merchant site (e.g., merchant sites 24, 26) by the clearinghouse site (see Table 1 above). The "Product ID" column of Table 3 represents the identifier used by a merchant site to identify one of its products (see Table 2 above). The "Clearinghouse Tracking ID" column of Table 3 represents the unique tracking identifiers created by the clearinghouse site and mapped to the individual merchant product information data identifiers.

The internal mapping tables may be retrieved, updated and managed by either the clearinghouse site 18 or the merchant site associated with the product information data in those internal mapping tables. According to the exemplary embodiment of the present invention, each set of internal mapping tables for the first merchant site 24 and the second merchant site 26 is created by the clearinghouse site 18 and is stored on the storage device 22. While the clearinghouse site 18 may update its stored tables based on updated product information data received from its merchant sites, each merchant site having a set of tables on the storage device 22 may also continually update its product information data without any explicit validation by the clearinghouse site 18. Any well known security measures may be used to allow merchant sites on their own to update their data stored in the internal mapping tables (e.g., login name and password, authorized keys, etc.).

Figure 3:
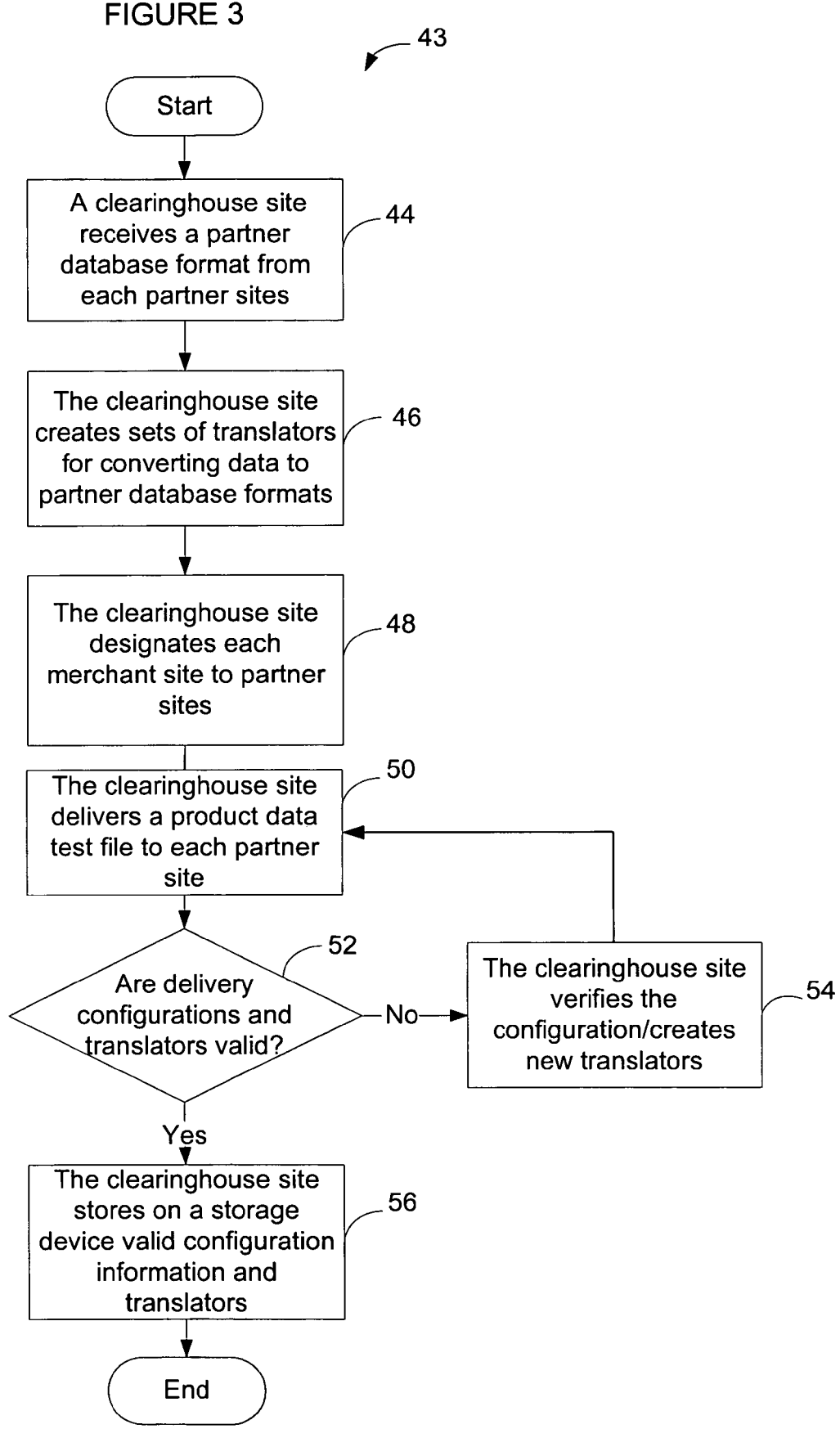
FIG. 3 is a flow chart illustrating a method for a first time registration of a partner site with the clearinghouse site.

Turning to FIG. 3, a method 43 for a first time registration of a partner site with the clearinghouse site 18 is presented in a flow chart. The first time registration method in FIG. 3 will be described as applied to the partner site 12 and the partner site 14. However, it should be understood that the same method could be applied to any number of partner sites requesting the clearinghouse site's services.

At step 44, the clearinghouse site 18 receives a set of registration documents from each partner site. According to the exemplary embodiment, the clearinghouse site 18 receives the registration documents from the partner sites 12 and 14. Thereinafter, the partner site 12 will be referred to as a first partner site 12 and the partner site 14 as a second partner site 14. The registration documents from each partner site comprise information detailing the partner database formats, file types and delivery methods required by each partner site for receiving the merchant sites' product information data or any other data from the clearinghouse site 18.

At step 46, a set of translators for converting data to partner database formats is created on the clearinghouse site 18. According to the exemplary embodiment, the first partner site 12 and the second partner site 14 operate as affiliate sites for the first merchant site 24 and the second merchant site 26 and, thus, a set of translators is created on the clearinghouse site 18 for each partner site. Each of the set of translators comprises a set of instructions for converting data compliant with the merchant database formats into data compliant with partner database formats. Preferably, but not necessarily, the merchant database format is compliant with the clearinghouse site database format. For instance, the merchant site 24 may employ a merchant database format having a field defined as a Product ID, and the partner site 12 may employ a partner database format having its first field defined as a SKU ID, and, further, the partner site 14 may employ a partner database format having its second field defined as a SKU ID. In such an arrangement, two sets of translators may include mapping/conversion instructions defining the Product ID of the merchant's database as the SKU ID for the first field of the partner database format of the partner site 12, and as the SKU ID for the second field of the partner database format of the partner site 14.

When the sets of translators are created for each partner site in the system 10, the clearinghouse site 18 designates the merchant sites to their appropriate partner sites, as shown at step 48. According to the exemplary embodiment, the clearinghouse site 18 designates each merchant site 24 and 26 to the first partner site 12 and the second partner site 14. Additionally, the clearinghouse site 18 may assign to each merchant site a merchant ID, as shown in Table 1 above. The clearinghouse site 18 may also create and assign a unique identifier, such as a LinkID, to each partner site to designate a correlation between the partner site and a clearinghouse site tracking identifier. The correlation between LinkIDs and their respective clearinghouse site tracking identifiers may be set forth in a table or tree and stored on the clearinghouse site for reference.

As previously mentioned, the clearinghouse site tracking identifier may then be mapped to particular merchant product via an internal mapping table stored on the clearinghouse site (see Table 3 above). Since there may be multiple partner sites affiliated with each merchant site, there may be multiple LinkIDs pointing to the same clearinghouse site tracking identifier (and thus a particular merchant product). Preferably, but not necessarily, no two partners have the same LinkIDs, although their LinkIDs may point to the same clearinghouse site tracking identifier and merchant product. It should be understood that other unique identifiers may be used in place of the LinkID to track individual products in a relationship between the merchant and partner sites, and the present invention should not be limited to the LinkID set forth in the present invention.

Returning to FIG. 3, at step 50, in order to verify the set of translators created for each partner site, the clearinghouse site 18 may send test product data files to the first partner site 12 and the second partner site 14. The clearinghouse site 18 may send the test product data files to each partner site using a delivery method specified by each partner site. For instance, the clearinghouse site 18 may attach the test product data file to an e-mail for a designated partner site, such as an e-mail for the partner site 12. The clearinghouse site 18 may also employ other delivery methods for sending the test product data files to the partner site 14. For instance, the clearinghouse site 18 may use FTP, HTTP, S-HTTP, TLS, SSL, or some other desirable delivery method. If the clearinghouse site 18 uses the HTTP method or the S-HTTP method, the clearinghouse site 18 may use a network path associated with the partner site 14 to send the test product data file. The clearinghouse site 18 may also use a username and a password provided by the second partner site 14 to access and place the test product data file on the server of the second partner site 14. If the clearinghouse site 18 employs a secure delivery method, such as S-HTTP, TLS, or SSL, a secure data exchange is possible since the connection would be typically encrypted from the clearinghouse site 18 while sending test product data file to the second partner site 14.

Next, at step 52, the clearinghouse site 18 tests a delivery configuration. If the delivery configuration is a valid configuration, the clearinghouse site 18 may verify whether the test product data file has been successfully placed on each partner site. If the test product data file has been successfully placed on the first partner site 12 and the second partner site 14, the partner sites 12, 14 may verify whether the formats of the test product data file are compliant with their partner database formats. If the partner sites 12, 14 verify that the formats are correct, the partner sites may notify the clearinghouse site 18 about the successful upload and the valid conversion translators.

However, if modifications of the delivery configuration are required, as shown at step 54, the clearinghouse site 18 may query the partner sites to verify the configuration information. Further, if the format of any test product data file is incorrect, the sets of translators including instruction for converting data to partner database formats may be reviewed for errors on the clearinghouse site 18. If any errors exist, new sets of translators may be created on the clearinghouse site 18 for the partner sites, and the new set of translators may be used to generate new test product data files. After any new sets of translators are created on the clearinghouse site 18, the process continues at step 50, as shown in FIG. 3.

At step 56, after the clearinghouse site 18 validates both the delivery configuration and the sets of translators for converting data, the clearinghouse site 18 then stores valid delivery configuration information and a valid set of translators associated with each partner site on the storage device 22. Thus, the valid sets of translators associated with each partner site may be used on the clearinghouse site 18 to convert any merchant site's data, such as product information data, to data compliant with the partner database format of each partner site.

As mentioned above, the partner sites in the system 10 may employ different methods enabling consumers to complete a transaction. As known in the art, some partner sites may be configured to re-direct consumers to a merchant site to complete a transaction with the merchant site, referred to as an "open loop" transaction method. In contrast, other partner sites may enable consumers to complete a transaction with a merchant site directly on the partner sites, referred to as a "closed loop" transaction method.

In the exemplary embodiment, if a partner site employs the closed loop transaction method, the partner site may employ a universal shopping cart technology, or a similar shopping cart technology, to enable a consumer to complete a transaction at the partner site. In general, as known in the art, the shopping cart is a common gateway interface ("CGI") based tool that passes information about individual products and quantities ordered, between the partner site and the consumer. The universal shopping cart technology is widely used in Internet commerce, and it is especially useful at web sites that advertise products and/or services of multiple merchants. The universal shopping cart technology simplifies shopping by enabling a consumer to place a single order for products associated with multiple merchants without the hassle of having to fill out separate registration/order forms and/or complete multiple payment transactions on multiple merchant sites.

Figure 4:
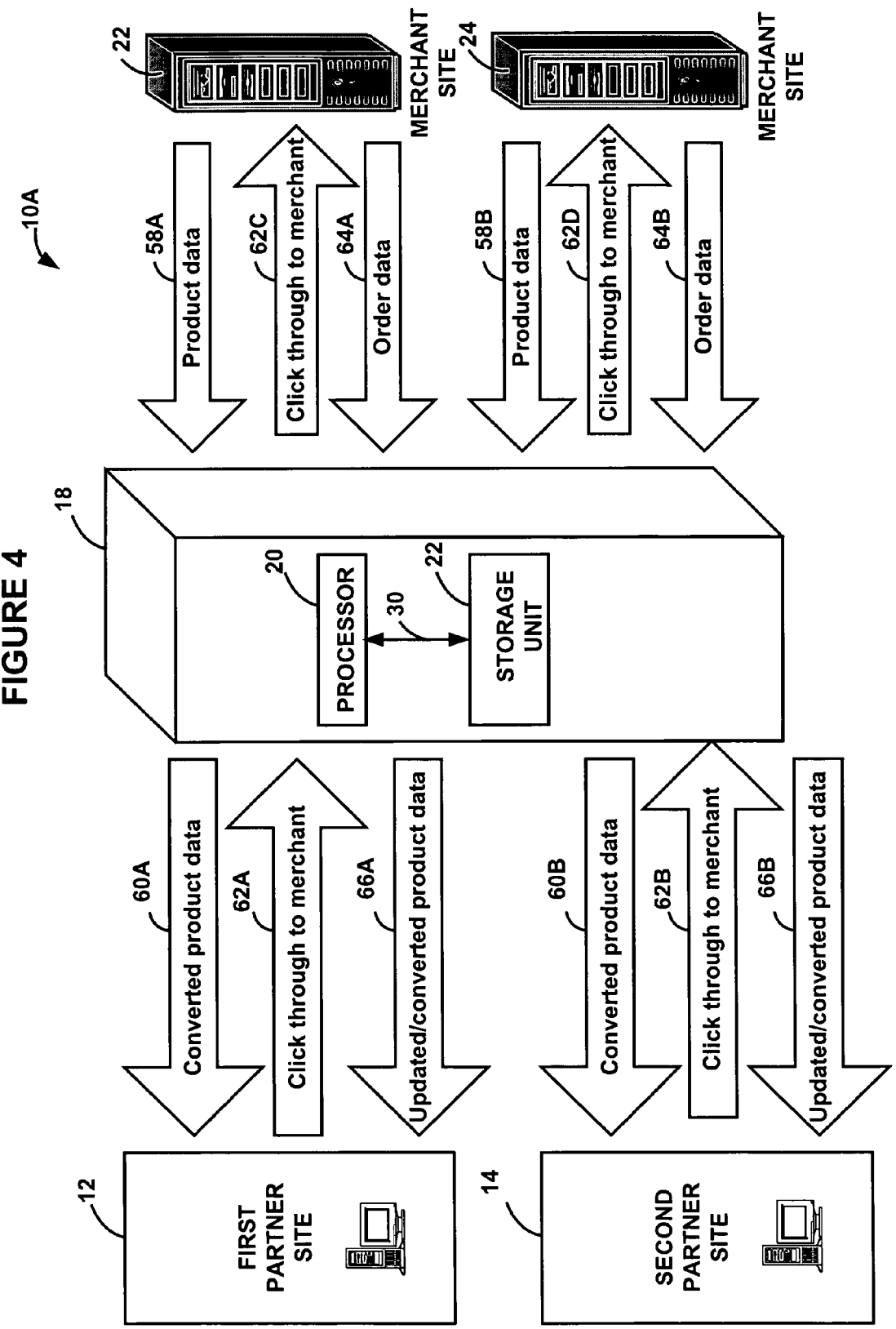
FIG. 4 is a block diagram illustrating an exemplary flow of data in an exemplary system of the present invention employing an "open loop" method for completing a transaction.

FIG. 4 shows an exemplary flow of data in a system 10a, in which the first partner site 12 and the second partner site 14 employs the "open loop" traction method. The system 10a is an exemplary sub-system of the system 10 shown in FIG. 1. As shown in FIG. 4, the system 10a comprises two merchant sites 22, 24 and two partner sites 12, 14. The present invention is not limited to such arrangement, however, and the present invention may be used with a system having a larger or smaller number of partner and/or merchant sites.

As shown in 58A and 58B of FIG. 4, the clearinghouse site 18 receives first data sets, such as product information data sets, from the first merchant site 22 and the second merchant site 24, respectively. According to the exemplary embodiment, the first data sets are organized in a merchant database format. Preferably, but not necessarily, the merchant database format is compliant with the clearinghouse database format specified by the clearinghouse site 18. In addition, the merchant sites may also send the first data sets to the clearinghouse site 18 using one of the valid delivery methods approved by the clearinghouse site 18 (e.g., email, FTP, HTTP, S-HTTP, TLS, SSL, etc.). Alternatively, the clearinghouse site 18 may query the merchant sites for the first data sets and, then dynamically download the first data sets from the merchant sites. Upon the reception of the first data sets, which preferably comprise product information data from the merchant sites, the clearinghouse site 18 verifies which partner sites have been designated to each merchant site. According to the exemplary embodiment, the first partner site 12 and the second partner site 14 are each designated as affiliate sites for the first merchant site 24 and the second merchant site 26. Thus, when the clearinghouse site 18 receives the first data sets from the merchant sites 22 and 24, the clearinghouse site 18 converts the received first data sets to formats compliant with the partner database formats of partner sites 12 and 14.

Next, the clearinghouse site 18 sends the converted first data sets to the appropriate partner sites, as shown at 60A and 60B. In addition to the converted first data sets, the clearinghouse site 18 may include in the messages 60A and 60B a set of clearinghouse site URL (i.e., Uniform Resource Locator) addresses with LinkIDs that point to URL addresses of merchant sites' product web pages. According to the exemplary embodiment, each clearinghouse site URL address leads a consumer from the partner site to the clearinghouse site 18, which, in turn, redirects the consumer (via a LinkID) to a designated URL address of a product web page on the merchant site. The designated URL address of the merchant site may be an address of a web page comprising product information or an address of an order web page (also known as a product-purchase web page). To distinguish between these two types of web pages on a given merchant site, the clearinghouse site 18 may create and assign separate clearinghouse site tracking identifiers for each type of web page, and also create and assign corresponding unique LinkIDs to the different URL addresses of the merchant. Such an arrangement allows the clearinghouse site to send to the partner sites LinkIDs with URL addresses leading to the clearinghouse site and its tracking identifiers, which in turn lead to the appropriate product information or order web page. It should be understood that the present invention is not limited to URL addresses associated with web pages that comprise product or order information, and URL addresses of other web pages could also be used.

According to the exemplary embodiment, each partner site may include a graphical selection input (i.e., a promotion), such as an advertisement or banner, or a textual selection input, such as a hyperlink, enabling a consumer to view a web page with the product information. Further, each partner site may include a graphical selection input or a textual selection input comprising a link to an order web page on the merchant site, thereby enabling the consumer to purchase a product at the merchant site. Thus, when the consumer decides to view and/or purchase a product, the consumer may select an appropriate selection input on the partner site.

When the consumer selects one of the inputs on the partner sites, the consumer is initially re-directed to the clearinghouse site 18, which interprets an identifier associated with the selected input and redirects the consumer to the appropriate web page (i.e., product, order or other) on the merchant site. The process described in this paragraph is shown as a click through to the merchant sites (via the clearinghouse site) at 62A, 62B, 62C and 62D of FIG. 4. It should be understood that such click throughs are preferably transparent to the consumer.

As the consumer is linked to the clearinghouse site 18, the clearinghouse site 18 appends the consumer's query and possibly inserts a cookie on a consumer's system. The cookie allows the clearinghouse site 18 to track the consumer's actions, such as placing a purchase on a merchant site, and to also track the affiliation between each partner site and the merchant site. When the consumer orders data on the merchant sites 22 and/or 24, the order data is sent from the merchant sites 22 and 24 to the clearinghouse site 18, as shown at 64A and 64B in FIG. 4. Then, the clearinghouse site 18 may store the order data on the storage unit 22. The clearinghouse site 18 may also track transactions between the partner sites and the merchant sites, or track how many consumers have clicked-through to the merchant sites from each partner site. Additionally, the clearinghouse site 18 may determine commission payments for each partner site based on the number of click-throughs to affiliated merchant sites and/or the click-throughs that resulted in product purchases on the merchant sites.

As shown in FIG. 4 at 66A and 66B, the clearinghouse site 18 may send new product information data to the partner sites 12 and 14. According to the exemplary embodiment, the new product information data corresponds to updated and converted product information data from the merchant sites that is compliant with the partner database formats of the partner sites 12 and 14. However, the present invention is not limited to sending the product information data from the merchant sites to the partner sites, and other types of data could also be sent.

Figure 5A:
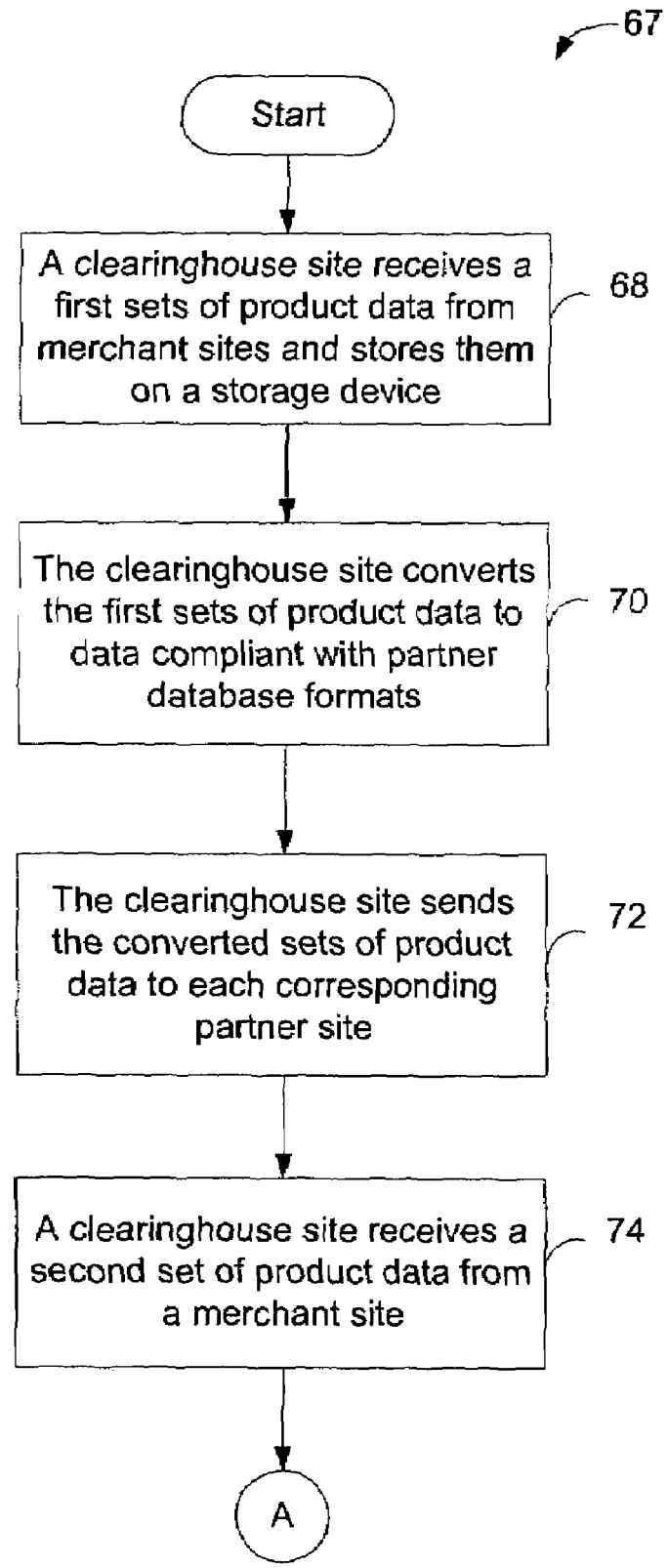
FIGS. 5A and 5B is a flow chart illustrating a method for converting product data and transmitting the converted product data by the clearinghouse site, according to the exemplary embodiment of the present invention.
Figure 5B:
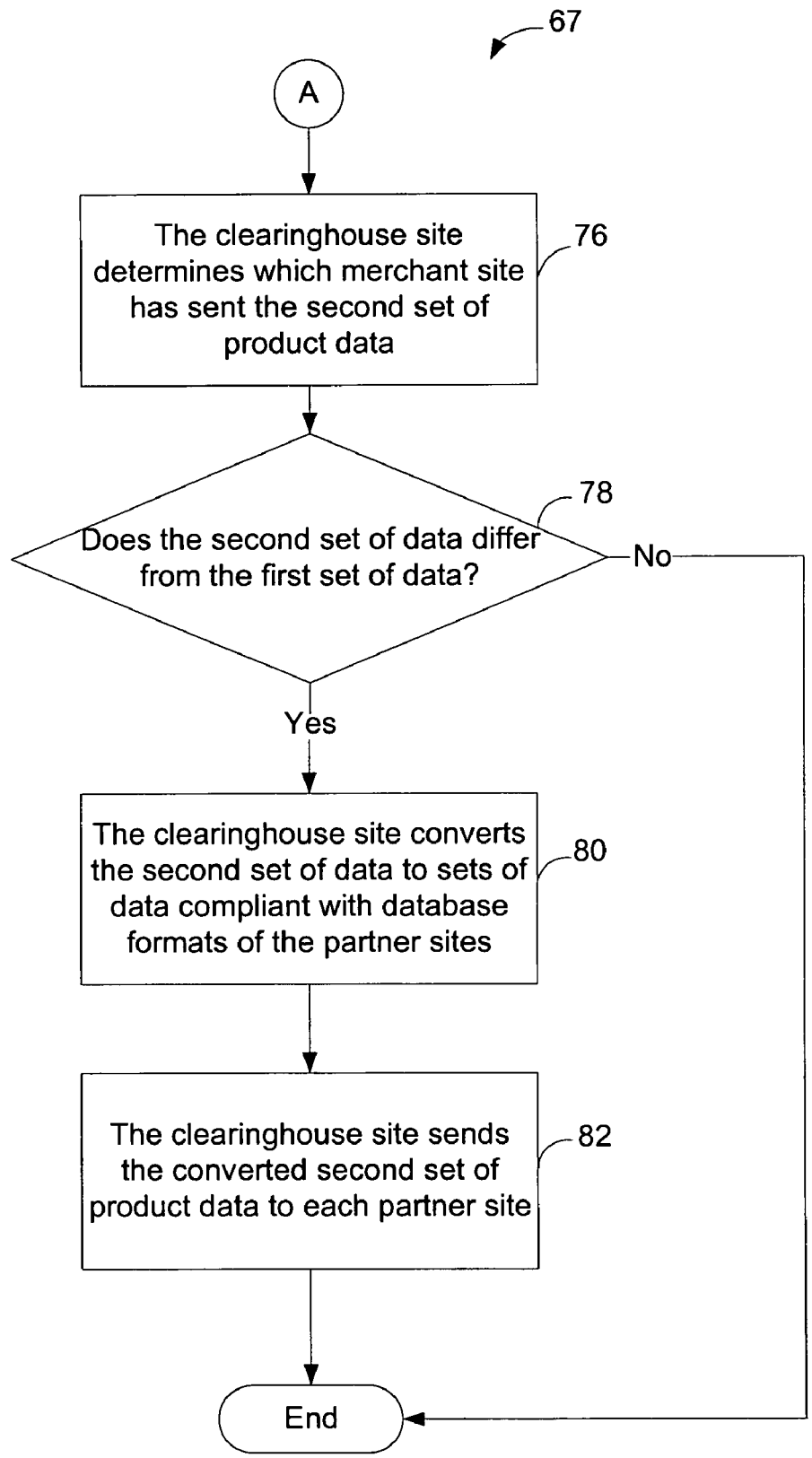

FIGS. 5A and 5B illustrate a method 67 for converting product information data from the merchant sites and transmitting the converted product information data by the clearinghouse site to the partner sites. At step 68, the clearinghouse site receives first sets of product information data, such as product SKU data sets, in a predetermined format from the merchant sites 24 and 26. Preferably, but not necessarily, the first set of data includes product information data organized in a merchant database format that is compliant with the clearinghouse database format. Further, the present invention is not limited to receiving on the clearinghouse site 18 only product information data, and the clearinghouse site 18 could also receive other types of data. Next, the clearinghouse site 18 stores the first sets of product information data on the storage unit 22, and then determines which partner sites are associated with each merchant site. To accomplish this determination, the clearinghouse site may use each merchant site's ID to learn which partner sites have been assigned to the merchant sites 24 and 26. According to the exemplary embodiment, the first partner site 12 and the second partner site 14 are both affiliate sites of the merchant sites 24 and 26.

Next, the processor 20 retrieves from the storage device 22 a set of translators for converting the received first set of product information data to a format that is compliant with each of the partner database formats. According to the exemplary embodiment, the first partner site 12 employs a first partner database format, and the second partner site 14 employs a second partner database format. At step 70, the processor 20 uses the retrieved translators to convert each received first product information data sets to formats compliant with the first partner database format and the second partner database format.

The following exemplary code may be used for a translator that converts product information to a partner database format:

```perl
#!/usr/bin/perl
# outputs to stdout a data feed formatted
# file from a Merchant's SKU data within the DDI
# database

##################################################################

use strict;
my $who;
BEGIN { chomp($who = 'whoami') }
use lib "/opt/dynamic/$who/ddi/translators";
use Translate qw(DDIFilter);
if ($#ARGV < 0 ) {
    print "Usage: ddi2_3510_partner <SourceID> [ <DestID> ]\n";
    exit 1;
}
DDIFilter(
    sourcePartner => $ARGV[0]
    ,destPartner => $ARGV[1] || 3510
    ,delim => "\t"
    ,format_subs => { }
,post_format_all_elements => sub {
my $x = shift;
$x or return $x;
#            $x =~ tr/''//d;
#            $x = qq("$x") if $x =~ /[,\t\n]/;
$x;
}
    ,header  => [qw(Product_ID Product_URL Category Brief_
            Description Long_Description Price Availability
            Brand_Name UPC/ISBN Product_Keyword)]
    ,data    => [qw(
        [ProductID|require_field]
        [ProductURL|require_field]
        [Category|require_field]
        [BriefDesc|require_field]
        [LongDesc|require_field]
        [Price|require_field]
        [InStock|require_field]
        [Brand|require_field]
        [UPC|require_field]
        [ProductKeyword|require_field]
    )]
);
```

It should be understood that the above exemplary code may be used for any of the product information conversions discussed herein. It should also be understood that the above code is only exemplary, and may be modified depending on system and programming preferences, as well as the specifications of the particular partner database format.

At step 72, the clearinghouse site 18 sends the first converted product information data sets to the respective partner sites. According to the exemplary embodiment, the clearinghouse site 18 sends the converted first sets of product information data to the first partner site 12 and the second partner site 14. As previously mentioned, the clearinghouse site may send the converted product data sets using methods specified by each partner site (e.g., e-mail, ftp, etc.).

Additionally, the clearinghouse site 18 may send a confirmation message to the merchant sites 24, 26 and the partner sites 12, 14 indicating that product information data sets have been successfully sent from the merchant site to the partner site.

At a later time, as shown at step 74, the clearinghouse site 18 may receive a second set of product information data (e.g., new or updated product information data) from a merchant site. When the clearinghouse site 18 receives the second set of product information data at step 76, the clearinghouse site 18 determines which of the merchant sites has sent the second set of product information data. To do that, the clearinghouse site 18 may use the merchant ID included with the second set of product information data. In the exemplary embodiment, the clearinghouse site 18 receives the second set of product information data from the first merchant site 24.

At step 78, the clearinghouse site 18 determines whether the second set of product information data includes new or updated product information data. To do that, the clearinghouse site 18 may compare the second set of product information data with the first set of product information data associated with the first merchant site 24 and stored on the storage device 22. If the second set of product information data does not differ from the first set of product information data that the clearinghouse site 18 has already converted and sent to the partner sites, then the process ends, as shown in FIG. 5B.

As shown in FIG. 5B, if the second set of product information data is a new or updated set of product information data, then the clearinghouse site's processor 20 retrieves the set of translators for converting product information data sets from the storage device 22 at step 80. Using the retrieved set of translators, the processor 20 may convert the second set of product information data to database formats compliant with the partner database formats. According to the exemplary embodiment, the partner sites 12 and 14 are affiliate sites of the first merchant site 24. Consequently, in this arrangement, the processor 20 converts the second set of product information data to formats compliant with the first partner database format and the second partner database format.

At step 82, the clearinghouse site 18 sends the respective, converted second sets of product information data to the partner sites 12 and 14. The method 67 is then completed until another new/updated set of product information data, or other type of data, is released by a merchant site. At this point, the method 67 is repeated for each new updated set of product information data.

Figure 6:
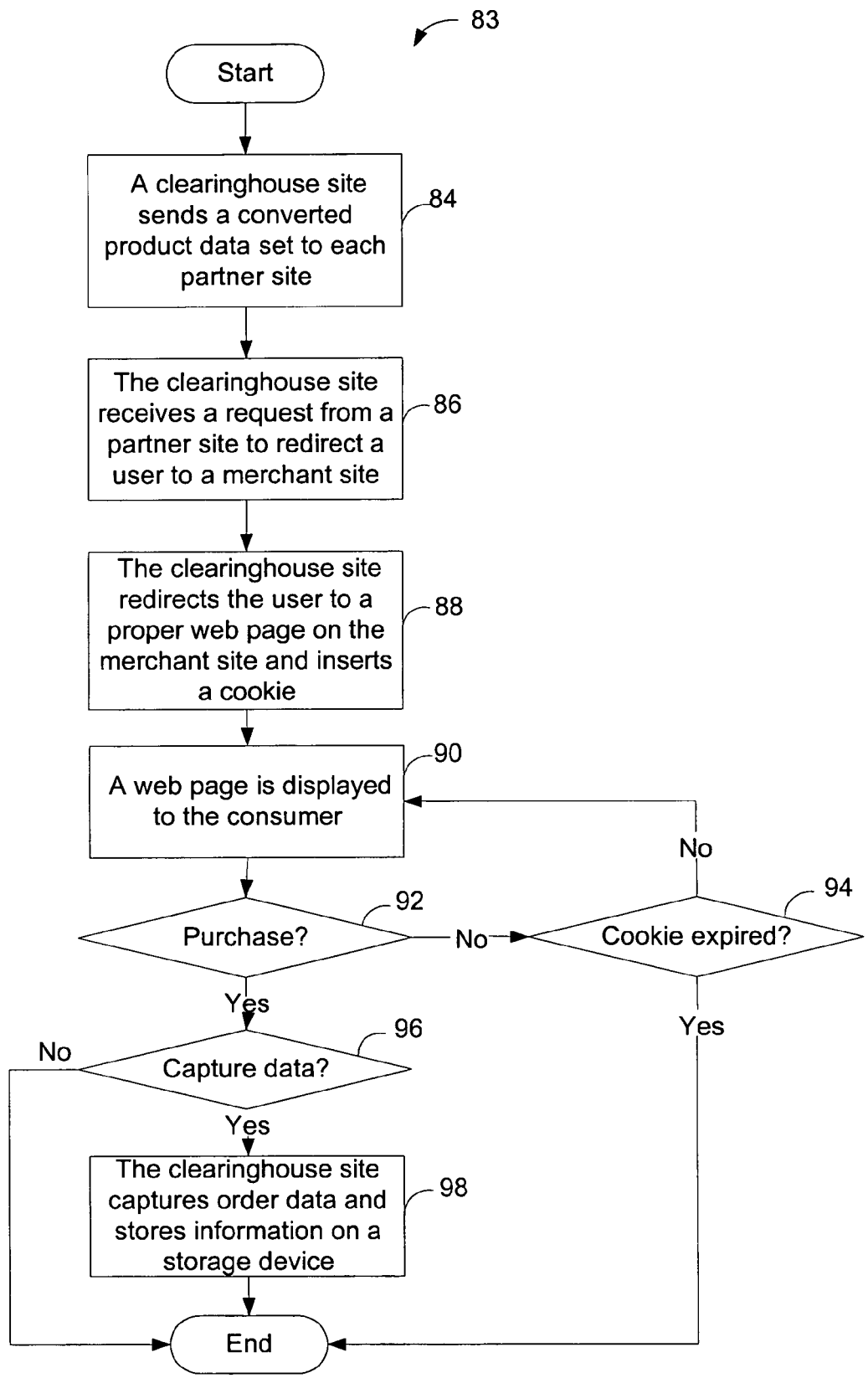
FIG. 6 is a flow chart illustrating a method for redirecting users to merchant sites for conducting transactions in an "open loop" system, according to the exemplary embodiment of the present invention.

FIG. 6 is a flow chart illustrating a method 83 for redirecting users to merchant sites for conducting transactions in the "open loop" system, according to the exemplary embodiment of the present invention. The method 83 begins with step 84, wherein the clearinghouse site 18 sends the converted sets of product information data from the merchant sites 24 and 26 to the partner sites 12 and 14. According to the exemplary embodiment, in addition to sending the converted sets of product information data, the clearinghouse site 18 may send to each partner site a set of IDs (e.g., LinkIDs), which are in turn associated with a set of URL addresses, for directing a consumer to web pages on the merchant sites. According to the exemplary embodiment, the set of URL addresses may comprise a URL address to a web page with product information and/or a URL address to an order web page on the merchant site. The clearinghouse site 18 may store the URL addresses for each merchant site on the data storage device 22, and may also store the unique ID (e.g., the Link ID) for each URL address of the web page. Thus, when a consumer clicks on one of the links provided on the partner sites, the consumer is first linked to the clearinghouse site 18 via the unique ID (e.g., the LinkID), and then to the appropriate merchant site via the associated URL address stored on the clearinghouse site.

When a consumer is redirected from a partner site to the clearinghouse site 18, the clearinghouse site 18 may determine how to redirect the consumer based on the ID (e.g., the LinkID) attached to the link. Such an embodiment may be especially useful if a merchant site changes an address of a web page with a product information or an address of an order web page, for instance. In such cases, the merchant site does not have to notify each partner site separately. Instead, the merchant site only notifies the clearinghouse site 18, which, in turn, may update its merchant site information on the storage device 22. Thus, using the updated merchant information, the clearinghouse site 18 may re-direct the consumer to a correct web page on the merchant site.

At step 86, the clearinghouse site 18 receives a request from a partner site to redirect a consumer to a merchant site. For instance, the clearinghouse site 18 may receive a redirection request from the first partner site 12. The ID (e.g., the LinkID) attached to the redirection request may indicate a request to redirect the consumer to an order web page on the first merchant site 24. Using the ID (e.g., the LinkID) attached to the redirection request, the clearinghouse site's processor 20 may invoke an associated clearinghouse site tracking identifier with a corresponding merchant URL address from the storage device 22 (see Table 3), and the consumer may be re-directed via this URL address to a correct web page on the merchant site 24. When the consumer is redirected to the merchant site, a proper web page is displayed to the consumer, as shown at step 90. According to the exemplary embodiment, an order web page is displayed to the consumer on the first merchant site 24. Alternatively, a web page with product information of the first merchant site 24 could be displayed to the consumer.

When the consumer is redirected to the clearinghouse site 18, the clearinghouse site 18 may insert a cookie on a consumer's system to track current and future actions of the consumer on the merchant site 24. As explained in more detail below, use of such cookies helps to ensure that a partner site receives credit and the appropriate commission payment for any purchases on merchant sites that originated from the partner site. As known in the art, the cookie may be active for a predetermined time (or indefinitely), during which time the clearinghouse site 18 may track the actions of the consumer on the merchant site.

At step 92, the clearinghouse site 18 verifies whether the consumer has made a purchase on the first merchant site 24. As shown at step 94, the clearinghouse site 18 tracks the actions of the consumer as long as the cookie is active. When the cookie expires and the consumer does not make a purchase, the method is completed. However, during the time when the cookie is active, the clearinghouse site tracks whether the consumer makes a purchase, i.e., an order confirmation or "Thank You" web page is displayed to the consumer. When the consumer makes a purchase on the order web page of the first merchant site 24, an image source request is made on the ensuing order confirmation or "Thank You" web page to the clearinghouse site 18 from the merchant site 24.

As known in the art, an image source request includes transaction information related to a given purchase. Upon receipt of the request, the clearinghouse site 18 determines whether it should capture order data, as shown at step 96. To do that, the clearinghouse site may examine the cookie files deposited with the user who purchased the product on the first merchant site 24. The clearinghouse site 18 may then determine whether one of these cookie files is a cookie that matches the transacting merchant site (e.g., merchant site 24) and was inserted on the consumer's system by the clearinghouse site 18. If the cookie matches the transacting merchant site (i.e., the image source request and the cookie have the same merchant ID) and is one of the cookies that was inserted by the clearinghouse site 18, then the clearinghouse site 18 captures order data (i.e., transaction information), as shown at step 98. Transaction information from both the image source request and the matching cookie may be captured by the clearinghouse site, which may also store the transaction information on the storage device 22 to allocate credit to the partner site 12. On the other hand, if there is no match between the cookie and the transacting merchant site, or the cookie was not placed on the consumer's system by the clearinghouse site, then the transaction information contained in the image source request is ignored by the clearinghouse site, and no order data is captured.

According to the exemplary embodiment, the merchant sites associated with the clearinghouse site preferably forward specific transaction data sets upon a completion of a valid transaction. However, the clearinghouse site 18 preferably captures and stores only those order data sets having cookies assigned by the clearinghouse site 18, or having other types of identifiers that could be used to identify one of the partner sites as being associated with the clearinghouse site and/or the merchant site. It should also be understood that transaction information data may be forwarded by merchant sites to the clearinghouse sites not only through image source requests, but also through data files and other like methods. Consequently, for purposes of the present application, transaction data sets includes at least any transaction information contained within both image source requests and data files. In addition, information from a plurality of valid transactions may be collected after being completed, and forwarded to the clearinghouse site together periodically at predetermined intervals (as opposed to individual transactions being sent over immediately after their completion).

FIG. 7 shows an exemplary flow of data in a system 10b, in which the partner sites 12 and 14 employ the "closed loop" transaction method. The system 10b shown in FIG. 7 is an exemplary sub-system of the system 10 shown in FIG. 1. The system 10b preferably comprises two merchant sites and two partner sites. The present invention is not limited to such arrangement, however, and the present invention could also be used with a system having a larger or smaller number of partner and/or merchant sites.

As shown at 100A and 100B, the clearinghouse site 18 receives first sets of data, such as sets of product information data, from the first merchant site 24 and the second merchant site 26, respectively. However, the present invention is not limited to the clearinghouse site 18 receiving only sets of product information data from the merchant sites, and the clearinghouse site 18 could also receive other types of data. The first sets of product information data are preferably, but not necessarily, organized into a format that is compliant with the clearinghouse database format. According to the exemplary embodiment, the merchant sites 24 and 26 may send the first sets of product information data to the clearinghouse site 18 with a variety of different delivery methods, including e-mail, FTP, HTTP, S-HTTP, TLS, or SSL. However, the present invention is not limited to these delivery methods, and other delivery methods could also be used. As an alternative, the clearinghouse site 18 may query the merchant sites for the first sets of product information data, and then may also dynamically download the sets of product information data from each merchant site.

Upon a reception of the first sets of product information data from the merchant sites, the clearinghouse site 18 may verify which partner sites have been designated as affiliate sites to each merchant site. According to the exemplary embodiment, the first partner site 12 and the second partner site 14 are designated as affiliate sites for each merchant site 24, 26. Thus, when the clearinghouse site 18 receives the first sets of product information data from the merchant sites 24 and 26, the processor 20 may retrieve information from the storage device 22 data about each merchant site's relationships with the partner sites in the system. Using that information, the processor 20 may retrieve from the storage device 22 a set of translators for converting the first sets of product information data to a format compliant with the partner database formats. According to the exemplary embodiment, the first partner site 12 employs a first partner database format and the second partner site 14 employs a second partner database format. Using the appropriate set of translators, the processor 20 may convert the first sets of product information data to the first and the second partner database formats.

Next, as shown in 102A and 102B, the clearinghouse site 18 sends the respective converted first sets of product information data to the first partner site 12 and the second partner site 14. As mentioned previously, each partner site in the "closed loop" system is configured to enable a consumer to complete a transaction at the partner site. According to the exemplary embodiment, each partner site may employ the universal shopping cart technology or a similar technology. Thus, since each partner site may include a number of products associated with different merchants, the universal shopping cart technology enables the partner sites to track purchases of individual merchant's products. In this arrangement, when the clearinghouse site 18 sends the converted first sets of product information data to the partner sites 12 and 14, it is not necessary for the clearinghouse site 18 to include any addresses of web pages on the merchant sites (e.g., product information or order web pages), since purchase of the merchants products is made at the partner sites.

In the "closed loop" system, the partner sites may be configured to periodically send data sets, such as transaction data sets (also known as fulfillment data sets), to the clearinghouse site 18. Similar to the product information data sets sent by the merchant sites, the partner sites preferably, but not necessarily, send the transaction data sets in a predetermined format compliant with the clearinghouse database format or some other predetermined format acceptable to both parties. The partner sites 12 and 14 may send the sets of transaction data to the clearinghouse site 18 every twenty-four hours, for instance. Alternatively, the partner sites may send the sets of transaction data immediately following each transaction. To send a set of transaction data, a partner site may use any predetermined delivery method such as e-mail, FTP, HTTP, HTTPS, or any other network protocol method. According to the exemplary embodiment, every set of transaction data may comprise information identifying a partner site, such as a partner ID, a product ID, an order amount, a time of order, a billing zip code, a merchant ID, and/or other relevant data necessary for the merchant site to fulfill the order.

When the clearinghouse site 18 receives the sets of transaction data from the partner sites, as shown at 104A and 104B, the clearinghouse site 18 processes the received sets of transaction data and updates the internal tables on the storage device 22. The internal tables, as previously mentioned, may include product information data, transaction data, referral data and/or tracking data. Using these tables, the clearinghouse site 18 may allocate a credit/commission to each partner site based on the actual amount of transaction.

Additionally, the clearinghouse site 18 may separate out each merchant site's transaction data from the sets of transaction data. Next, the processor 20 may retrieve from the storage device 22 a set of translators for converting transaction data to each of the merchant database formats. According to the exemplary embodiment, the first merchant site 24 employs a first merchant database format and the second merchant site 26 employs a second merchant database format. Using the set of translators, the processor 20 may convert the transaction data received from the partner sites to the proprietary first and the second merchant database formats. Then, as shown at 104C and 104D, the clearinghouse site 18 may send the respective converted sets of transaction data to appropriate merchant sites 24 and 26.

Except for the type and content of the information being converted, the process for converting transaction data into merchant database formats is essentially the same as the process for converting product data information into partner database formats described above. The following exemplary code may be used for a translator that converts transaction information to a merchant database format:

```
#!/usr/bin/perl
# outputs to stdout a data feed formatted
# file from a Partners fulfillment data within the DDI
# database

###########################################################

use strict;
my $who;
BEGIN { chomp($who = 'whoami') }
use lib "/opt/dynamic/$who/ddi/translators";
use Translate qw(DDITransact);
if ($#ARGV < 0) {
    print "Usage: ddi2_5_marketer <DestID> [ <SourceID> ]\n";
    exit 1;
}
DDIFilter(
    sourcePartner => $ARGV[0]
    ,destMerchant => $ARGV[1] || 45
    ,delim => "\t"
    ,format_subs => { }
,post_format_all_elements => sub {
my $x = shift;
$x or return $x;
#           $x =~ tr/'`//d;
#           $x = qq("$x") if $x =~ /[,\t\n]/;
$x;
}
    ,data    => [qw(
        [ProductID|require_field]
        [Quantity|require_field]
        [Price|require_field]
        [Sub_total|require_field]
        [Taxes|require_field]
        [Total_Amount|require_field]
        [Ship_To_Name|require_field]
        [Ship_To_Address1|require_field]
        [Ship_To_Address2|require_field]
        [Ship_To_City|require_field]
        [Ship_To_State|require_field]
        [Ship_To_Zip|require_field]
        [Bill_To_Name|require_field]
```

-continued

```
        [Bill_To_Address1|require_field]
        [Bill_To_Address2|require_field]
        [Bill_To_City|require_field]
        [Bill_To_State|require_field]
        [Bill_To_Zip|require_field]
        [CC_Type|require_field]
        [CC_Number|require_field|PGP_string]
        [CC_Exp|require_field]
        [Gift_Message|require_field]
        [Ship_Instructions|require_field]
    )]
);
```

It should be understood that the above exemplary code may be used for any of the transaction information conversions discussed herein. It should also be understood that the above code is only exemplary, and may be modified depending on system and programming preferences, as well as the specifications of the particular merchant database format.

As shown at the 106A and 106B in FIG. 7, the clearinghouse site 18 may receive second sets of product information data from the merchant sites 24 and 26. Preferably, but not necessarily, the second sets of product data are in a merchant database format that is complaint with the clearinghouse database format. Consequently, if the second sets of product information data are new sets of product information data, the clearinghouse site 18 may save the new sets of product information data in the internal tables on the storage device 22. Further, it may convert the received sets of product information data to a data compliant with the partner database formats, and then may send the new and converted sets of product information data to the respective partner sites 12 and 14, as shown at 108A and 108B.

FIG. 8 is a flow chart illustrating a method 109 for tracking transactions in a "closed loop" system, according to the exemplary embodiment of the present invention. At step 110, the clearinghouse site 18 sends converted sets of product information data, such as product SKU data, received from the merchant sites to the partner sites associated with each merchant site. According to the exemplary embodiment, the clearinghouse site 18 may send the converted sets of product information data from merchant sites 24 and 26 to each of the partner sites 12 and 14. For this method, the partner sites 12 and 14 may employ the universal shopping cart technology enabling a consumer to complete a transaction on each partner site.

At step 112, the clearinghouse site 18 receives sets of transaction data from the partner sites 12 and 14. The partner sites may forward transaction data periodically to the clearinghouse site 18, or the clearinghouse site 18 may be configured to query the partner sites for the transaction data. Preferably, the transaction data that the clearinghouse site 18 receives from the partner sites is organized in partner database formats that are predetermined database management formats defined by the clearinghouse site 18, such as the clearinghouse database format.

At step 114, the clearinghouse site 18 separates out each individual merchant site's transaction data from the sets of transaction data received from the partner sites. Next, as shown at step 116, the clearinghouse site 18 updates an internal set of fulfillment tables on the storage device 22 to include each set of transaction data. According to the exemplary embodiment, the internal fulfillment tables may comprise information on products of each merchant site, product availability, product shortage, transaction data, fulfillment data, referral data, and/or other secure sensitive data. The following is an exemplary internal fulfillment table suitable for use with the present invention:

TABLE 4

| Transaction Data Fields | Description |
| --- | --- |
| Ship_to_Title | The data necessary to complete the shipping process. |
| Ship_to_First Name | |
| Ship_to_Middle Name | |
| Ship_to_Last Name | |
| Ship_to_Suffix | |
| Ship_to_Email | |
| Ship_to_Address 1 | |
| Ship_to_Address 2 | |
| Ship_to_City | |
| Ship_to_Province | |
| Ship_to_State | |
| Ship_to_Country | |
| Ship_to_Zip | |
| Ship_to_Phone_Daytime | |
| Ship_to_Phone_Evening | |
| Bill_to_Title | The data necessary to complete the billing process. |
| Bill_to_First Name | |
| Bill_to_Middle Name | |
| Bill_to_Last Name | |
| Bill_to_Suffix | |
| Bill_to_Email | |
| Bill_to_Address 1 | |
| Bill_to_Address 2 | |
| Bill_to_City | |
| Bill_to_Province | |
| Bill_to_State | |
| Bill_to_Country | |
| Bill_to_Zip | |
| Bill_to_Phone_Daytime | |
| Bill_to_Phone_Evening | |
| CreditCard_Type | |
| CreditCard_Number | |
| CreditCard_Expires | |
| Sub_Total | |
| Shipping_Cost | |
| Taxes | |
| Order_Total | |
| Order_ID | The data necessary to complete the fulfillment process. |
| Product_SKU | |
| Product_Quantities | |
| Product_Price | |
| Manf_Skus | |
| Manf_Price | |

It should be understood that any sensitive information, such as credit card numbers, may be transmitted only with appropriate security measures (e.g., encryption techniques) in place.

Returning to FIG. 8, at step 118, the clearinghouse site 18 converts the sets of transaction data for each merchant site to a data format that is compliant with each merchant site's proprietary merchant database format. According to the exemplary embodiment, if the sets of transaction data comprise data directed to merchant sites 24 and 26, the clearinghouse site 18 aggregates and converts the respective sets of transaction data to the merchant database format of the merchant site 24 and the merchant database format of the merchant site 26.

At step 120, the clearinghouse site 18 forwards the converted sets of transaction data to the respective merchant sites 24 and 26. To do that, the clearinghouse site 18 may employ any predetermined delivery method, such as e-mail, FTP, HTTP, or S-HTTP. However, as previously mentioned, any other network delivery method could also be used.

The present invention is not limited to systems utilizing either the "open loop" method or the "closed loop" method. Indeed, the systems shown in FIG. 4 and FIG. 7 may be readily combined in connection with the present invention. In such a combined system, some of the partner sites may register with the clearinghouse site 18 as sites redirecting consumers to complete a transaction at merchant sites, i.e., "open loop" systems. On the other hand, other partner sites may register as sites enabling consumers to complete transactions at their sites, i.e., "closed loop" systems. Moreover, some partner sites may register as both "open loop" and "closed loop" sites.

Figure 9A:
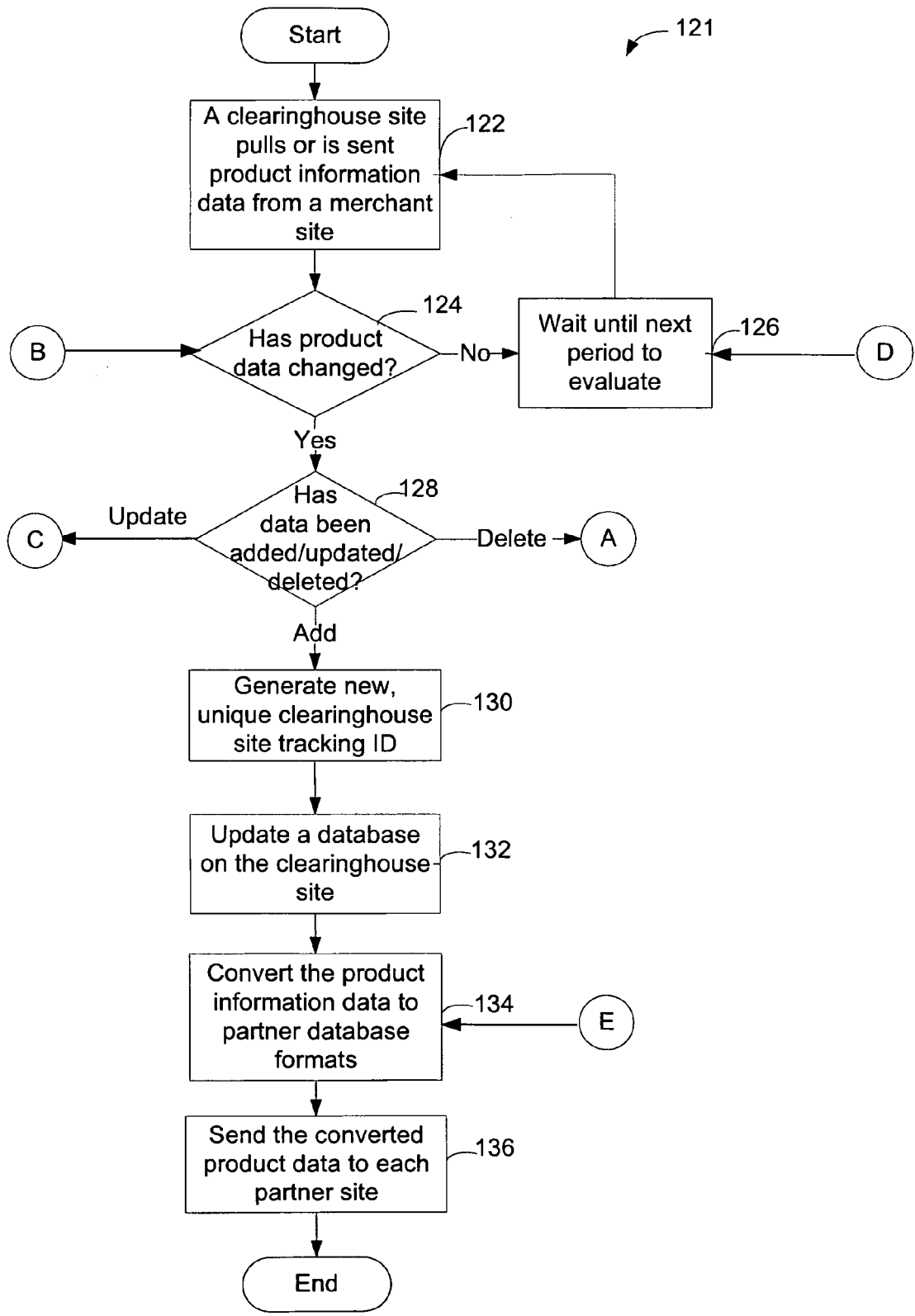
FIGS. 9A-9C is a flow chart illustrating a method for managing and updating product data on partner sites by the clearinghouse site.
Figure 9B:
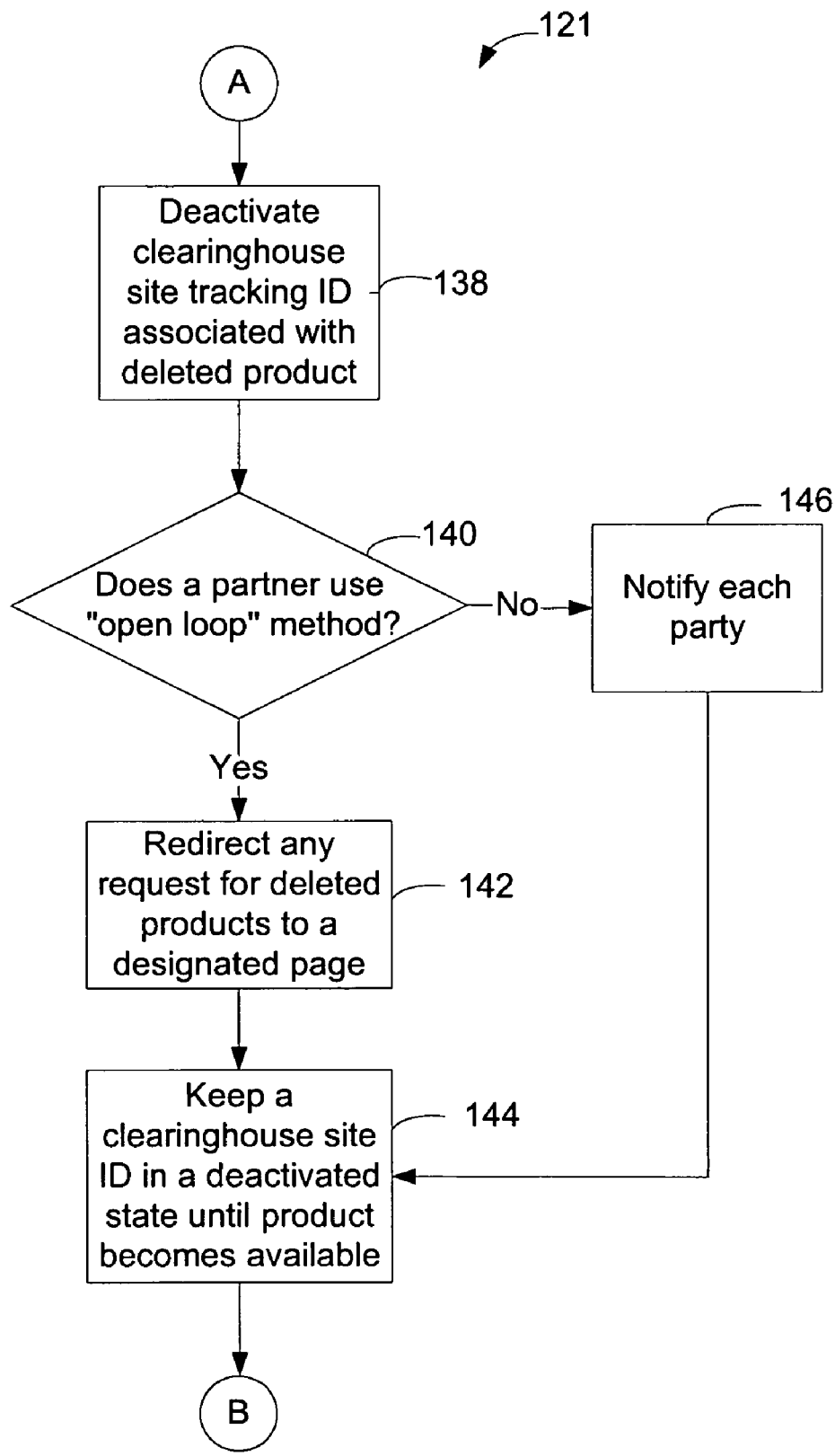
Figure 9C:
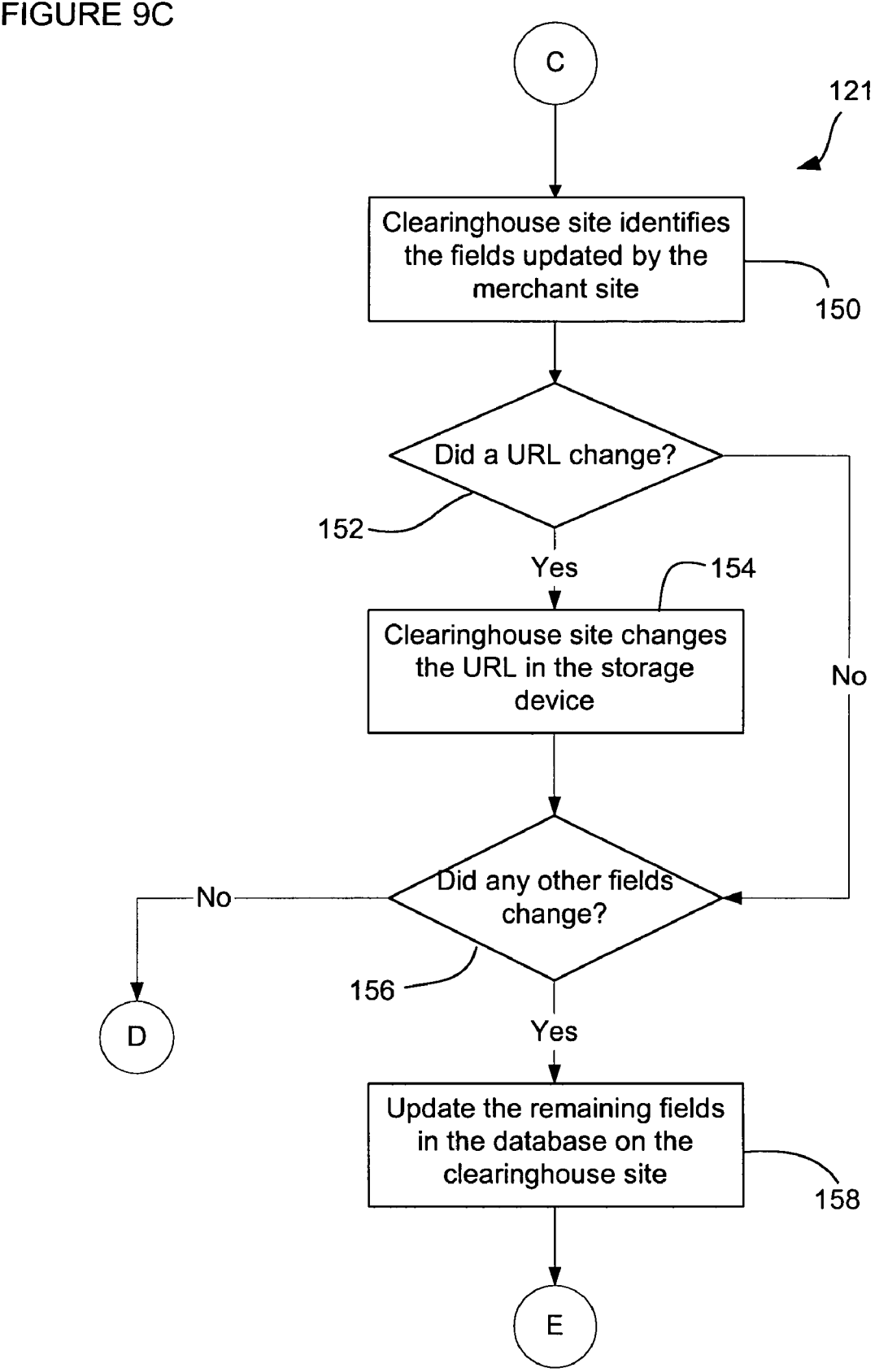

FIGS. 9A-9C are flow charts illustrating a method 121 for managing and updating product information data on partner sites by the clearinghouse site 18 in a system, in which some of the sites employ the "open loop" method and other sites employ the "closed loop" method. The method 121 for updating product information data, as shown in FIGS. 9A and 9B, will be described in reference to one merchant site and a number of the partner sites. However, it should be understood that this method could be applied to any number of merchant sites. Furthermore, while the method 121, as described, is directed to updating product information data, such as product SKU data, it should be understood that the method 121 could be also employed with other types of data.

At step 122, the clearinghouse site 18 retrieves a first set of product information data from a merchant site, such as the first merchant site 24. The first merchant site 24 may store the first set of product information data in a merchant database format that preferably, but not necessarily, is compliant with the clearinghouse database format. The present invention is not limited to the clearinghouse site 18 retrieving the set of product information data from the first merchant site 24. According to an alternative embodiment, the first merchant site 24 could be configured to send the set of product data to the clearinghouse site 18.

At step 124, the processor 20 on the clearinghouse site 18 may verify whether the received set of product information data comprises new product information data. To do that, the processor 20 may first verify whether the storage device 22 comprises any product data sets associated with the merchant site 26. If the storage device 22 comprises any sets of product information data, the processor 20 may verify whether the received set of product information data comprises any new or updated data. If the received set of product information data does not include any new or updated data, the clearinghouse site 18 may wait a predetermined period to evaluate the product information data on the first merchant site 24, as shown at step 126. After the predetermined period has passed, the process continues at step 122.

If the processor 20 verifies that the received set of product information data differs from the set of product information data stored on the storage device 22 (or there was no product information data stored on the storage device 22 to begin with), the processor 20 determines whether any product information data has been added, updated, or deleted, as shown at step 128. If the processor 20 concludes that new product information data has been added to the first merchant site's product information data set stored on the storage device 22 then, at step 130, a new clearinghouse site tracking identifier is generated on the clearinghouse site 18 for each new product information data.

Next, at step 132, the clearinghouse site 18 stores the new clearinghouse site tracking identifier on the storage device 22 in the internal tables. Further, if the first merchant site 24 adds a new product to its set of product information data, the clearinghouse site 18 may search for and recruit a number of partner sites to ensure that the merchant site 24 gets the best set of partner sites to advertise the new product. Additionally, before assigning the merchant site 24 to its affiliated partner sites, the clearinghouse site 18 may verify whether the merchant site meets certain requirements of the partner sites. For instance, the partner site may require a gift-wrapping service to be provided by the merchant site in order to establish an affiliation.

As shown in FIG. 9A, at step 134, the clearinghouse site 18 converts the new product information data from its merchant database format (which is preferably, but not necessarily) compliant with the clearinghouse database format) to partner database formats of each affiliated partner site using the clearinghouse site's conversion translators (see above). Next, at step 136, the clearinghouse site 18 sends the converted new product information data to each partner site.

Returning to step 128, if the processor 20 determines that a product has been deleted from the product information data set associated with the merchant site 24, then, at step 138, the processor 20 deactivates a clearinghouse site tracking ID associated with the deleted product, as shown in FIG. 9B. According to the exemplary embodiment, however, the deletion of a product in a merchant site's set of product information data does not cause a complete deletion of information corresponding to the product on the clearinghouse site 18. For instance, the merchant site may be currently out of the product, but the product may be back in stock in a few weeks. In such a case, when the product is re-stocked and appears back in the merchant site's product information data set, the clearinghouse site 18 may re-activate the original clearinghouse site tracking ID, as well as the original affiliation between the merchant site and the original partner sites that were advertising and/or selling that product.

At step 140, the clearinghouse site 18 determines which of the partner sites, associated with the deleted product, employ the "open loop" method for completing transactions. For such sites, as shown at step 142, the clearinghouse site 18 may re-direct any request for the deactivated template tracking identifier to a new designated web page on the merchant site associated with the deleted product. The designated web page may comprise information notifying a consumer of a product's shortage, or it may comprise information recommending alternative products and/or services on the merchant site associated with the deleted product.

As shown at step 144, the clearinghouse site 18 may keep the deactivated clearinghouse site tracking ID in the deactivated state until the product becomes available on the first merchant site 24. After a certain period of time expires, or upon information from the merchant site that the product has been permanently deleted, the clearinghouse site 18 may completely remove and delete the product clearinghouse site tracking ID from its database.

Although not shown in FIG. 9B, the clearinghouse site 18 may also want to notify each of the partner sites employing the "open loop" method that a particular product has been temporarily or permanently deactivated (see step 146 below), and may even send each partner site updated product information data (i.e., new clearinghouse site tracking identifiers) (see steps 134 and 136). As a result of this notification and/or update, partner sites can keep their promotions current and avoid promoting deactivated products. Such notification and/or update is not ultimately necessary in the "open loop" method, however, and may be undesirable for products that are only deactivated for a short period of time. For instance, it may be undesirable to notify partner sites, or provide them with updated product data information, for products that are deactivated for only a few hours (or days) because their web pages are being redesigned and worked on offline.

Returning now to step 140, if any number of the partner sites employs the "closed loop" method, the clearinghouse site 18 notifies such partner sites associated with the deleted product as shown at step 146. In addition, the clearinghouse site 18 may send an e-mail to each consumer who ordered the product on any partner sites. The e-mail may include a message to the consumer that the product is out of the merchant site's inventory, and/or it may include an alternative product or recommendation. More specifically, the clearinghouse site 18 may notify each partner site that the shortage of that product has occurred or that the product has been discontinued. After such notification is completed, the method 121 continues at step 144, as shown in FIG. 9B. From step 144, the method 121 proceeds to step 124 (see FIG. 9A).

Returning once again to step 128, if the processor 20 determines that data has been updated from the product information data set associated with the merchant site 24, then, at step 150, the clearinghouse site identifies the fields that have been updated by the merchant site, as shown in FIG. 9C. Next, a determination is made at step 152 as to whether a URL address (i.e., for a product web page or an order web page) was changed by the merchant site. If so, then the clearinghouse site changes the URL address stored in its storage device 22 at step 154 to reflect the updated merchant site's URL address. Preferably, all of the modified URL address are updated at step 154.

After all the changed URL address have been updated, or if no URL addresses were changed, the method 115 continues with step 156, wherein a determination is made as to whether any other fields (besides URL addresses) have been changed by the merchant site. If there are no other fields that have been changed or need to be updated, then the method 121 continues with step 126 (see FIG. 9A). If other fields have been changed, however, then such fields are updated in the database on the clearinghouse site (i.e., the internal tables stored in the storage device 22) at step 158. The method 121 then continues with step 134 (see FIG. 9A).

Those skilled in the art to which the invention pertains may make modifications and other embodiments employing the principles of this invention without departing from its spirit or essential characteristics, particularly considering the foregoing teachings. For example, unless specified to the contrary, the steps of the flow charts may be taken in sequence other than those described, and more or fewer elements or components may be used. Accordingly, the described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials, and the like would be apparent to those skilled in the art, yet would still fall within the scope of the invention.

We claim:

1. A method for using a clearinghouse site, in communication via a communication network with a merchant site having a merchant database and a partner site having a partner database, to allow for an exchange of product data between the merchant site and the partner site, the method comprising:

storing a first set of product data in the clearinghouse database, the first set of data being extracted from the merchant database;

receiving at the clearinghouse site a first registration document that specifies a database format for use by the clearinghouse site in transmitting product data to the partner site, the registration document being transmitted to the clearinghouse site from the partner site via the communication network;

using at the clearinghouse site the first registration document by placing a second set of product data, extracted from the first set of data stored in the clearinghouse database, into database fields that comply with the database format specified in the first registration document; and transmitting from the clearinghouse site to the partner site via the communication network the formatted second set of product data for storage in the partner site database whereby the stored, second set of product data is made accessible to a consumer visiting the partner site to thereby allow for viewing at the partner site of information concerning merchant site product offerings without requiring the consumer to visit the merchant site directly.

2. The method as recited in claim 1, comprising transmitting from the clearinghouse site to the merchant site via the communication network a second registration document that specifies a database format for use by the merchant site in transmitting product data to the clearinghouse site; using at the merchant site the second registration document by placing the first set of product data, extracted from the merchant site database, into database fields that comply with the database format specified in the second registration document; transmitting from the merchant site to the clearinghouse site via the communication network the formatted first set of product data; and storing the first set of product data in the clearinghouse database.

3. The method as recited in claim 2, wherein the second registration document is transmitted from the clearinghouse site to the merchant site via the communication network in response to a request to create an account for the merchant site.

4. The method as recited in claim 2, wherein the second registration document specifies an electronic delivery method and transmitting from the merchant site to the clearinghouse site via the communication network the formatted first set of product data comprises using the specified electronic delivery method.

5. The method as recited in claim 1, wherein the first registration document specifies an electronic delivery method and transmitting from the clearinghouse site to the partner site via the communication network the formatted second set of product data comprises using the specified electronic delivery method.

6. The method as recited in claim 1, comprising transmitting from the clearinghouse site to the partner site via the communication network information that functions to correlate the second set of data stored in the partner database to the merchant database from which the first set of product data was extracted.

7. The method as recited in claim 6, comprising transmitting from the clearinghouse site to the partner site via the communication network an address for use in accessing a merchant site web page via the communication network.

8. The method as recited in claim 7, comprising providing access to the merchant site web page in response to a selection of the address by providing from the partner site to the clearinghouse site via the communication network the information that functions to correlate the second set of data stored in the partner database to the merchant database from which the first set of product data was extracted and by using at the clearinghouse site the information to provide access to the merchant site web page via the communication network.

9. The method as recited in claim 8, wherein the merchant site web page comprises a web page for use in accepting orders for one or more products represented by the first set of product data.

10. The method as recited in claim 9, comprising tracking consumer interaction with the merchant site web page to thereby allow for partner site commission payments to be made for purchases of products at the merchant site.

11. The method as recited in claim 1, wherein the communication network comprises the Internet.

12. A method for using a clearinghouse site, in communication via a communication network with a merchant site and a partner site having a partner database, to facilitate a sale of merchant products from the partner site, the method comprising:

storing a first set of product data in the clearinghouse database, the first set of product data being transmitted to the clearinghouse site from the merchant site via the communication network;

receiving at the clearinghouse site a registration document that specifies a database format for use by the clearinghouse site in transmitting product data to the partner site, the registration document being transmitted to the clearinghouse site from the partner site via the communication network;

using at the clearinghouse site the registration document by placing a second set of product data, extracted from the first set of product data stored in the clearinghouse database, into database fields that comply with the database format specified in the registration document;

transmitting from the clearinghouse site to the partner site via the communication network the formatted second set of product data whereby the partner site stores the second set of product data in the partner database;

receiving at the clearinghouse site a request to access via the communication network a merchant site web page having information relevant to one or more products represented by the second set of product data stored in the partner database, the request being transmitting to the clearinghouse site from the partner site via the communication network;

facilitating access to the merchant site web page via the communication network by using an identifier received at the clearinghouse site in connection with the request, the identifier linking the second set of product data to the merchant site; and tracking at the clearinghouse site consumer interaction with the merchant site web page to thereby allow for a commission payment to be made for purchases of merchant products attributable to accessing of the merchant site web page via the partner site.

13. The method as recited in claim 12, wherein the second registration document specifies an electronic delivery method and transmitting from the clearinghouse site to the partner site via the communication network the formatted second set of product data further comprises using the specified electronic delivery method.

14. The method as recited in claim 13, wherein the merchant site web page comprises a web page for use in ordering the one or more of the products.

15. The method as recited in claim 12, wherein tracking consumer interaction with the merchant site web page comprises using a cookie.

16. A method for using a clearinghouse site, in communication via a communication network with a merchant site having a merchant database and a partner site having a partner database, to facilitate a sale of merchant products from the partner site, the method comprising:

storing a first set of product data in the clearinghouse database, the first set of data being transmitted to the clearinghouse site from the merchant site via the communication network;

receiving at the clearinghouse site a first registration document that specifies a database format for use by the clearinghouse site in transmitting product data to the partner site, the registration document being transmitted to the clearinghouse site from the partner site via the communication network;

receiving at the clearinghouse site a second registration document that specifies a database format for use by the clearinghouse site in transmitting product ordering data to the merchant site, the registration document being transmitted to the clearinghouse site from the merchant site via the communication network;

using at the clearinghouse site the first registration document by placing a second set of product data, extracted from the first set of product data stored in the clearinghouse database, into database fields that comply with the database format specified in the first registration document;

transmitting from the clearinghouse site to the partner site via the communication network the formatted second set of product data whereby the partner site stores the second set of product data in the partner database;

receiving at the clearinghouse site from the partner site via the communication network a request to purchase one or more products represented by the second set of product data stored in the partner database, the request including product ordering data;

using at the clearinghouse site the second registration document by placing product ordering data, extracted from the request, into database fields that comply with the database format specified in the second registration document;

transmitting from the clearinghouse site to the merchant site via the communication network the formatted product ordering data whereby the merchant site stores the product ordering data in the merchant database to thereby facilitate product purchasing fulfillment; and tracking at the clearinghouse site product purchasing fulfillment to thereby allow for a commission payment to be made for purchases of merchant products attributable to a consumer accessing the partner site.

17. The method as recited in claim 16, wherein tracking comprises using a cookie.

* * * * *